US010362589B2

(12) United States Patent
Kim et al.

(10) Patent No.: US 10,362,589 B2
(45) Date of Patent: Jul. 23, 2019

(54) COMMUNICATION METHOD AND APPARATUS USING MULTIPLE ANTENNAS IN WIRELESS COMMUNICATION SYSTEM

(71) Applicant: ELECTRONICS AND TELECOMMUNICATIONS RESEARCH INSTITIUTE, Daejeon (KR)

(72) Inventors: Eun Kyung Kim, Daejeon (KR); Young Jo Ko, Daejeon (KR); Seok Ki Kim, Daejeon (KR); Won Ik Kim, Daejeon (KR); Seung Kwon Baek, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/877,129

(22) Filed: Jan. 22, 2018

(65) Prior Publication Data
US 2018/0227928 A1    Aug. 9, 2018

(30) Foreign Application Priority Data

Jan. 23, 2017  (KR) ........................ 10-2017-0010669
Jan. 16, 2018  (KR) ........................ 10-2018-0005500

(51) Int. Cl.
*H04L 5/00*    (2006.01)
*H04B 7/06*    (2006.01)
(Continued)

(52) U.S. Cl.
CPC ........ *H04W 72/085* (2013.01); *H04B 7/0617* (2013.01); *H04B 7/0695* (2013.01);
(Continued)

(58) Field of Classification Search
CPC ...... H04B 1/00; H04B 7/0617; H04B 7/0695; H04B 7/088; H04B 7/12; H04B 7/04; H04B 2201/00; H04W 72/085; H04W 72/048; H04W 72/082; H04W 16/28; H04L 5/003; H04L 5/0048; H04L 5/005
See application file for complete search history.

(56) References Cited

U.S. PATENT DOCUMENTS 8,115,677 B2    2/2012  Splett
2009/0232240 A1    9/2009  Lakkis
(Continued)

*Primary Examiner* — Afsar M Qureshi
(74) *Attorney, Agent, or Firm* — Rabin & Berdo, P.C.

(57) ABSTRACT

Disclosed are a communication method and a communication apparatus using multiple antennas in a wireless communication system. A communication method of a receiver comprises receiving reference signals from a transmitter of the communication system through beams to which the hybrid beamforming is applied; selecting at least one analog beam having a quality equal to or higher than a preset threshold value among analog beams belonging to the beams, based on the reference signals; and selecting at least one digital beam corresponding to the at least one analog beam and having a quality equal to or higher than the preset threshold value among digital beams belonging to the beams, based on the reference signals. Thus, performance of the communication system can be improved.

20 Claims, 24 Drawing Sheets

(51) Int. Cl.
  *H04W 72/08*  (2009.01)
  *H04B 7/08*  (2006.01)
  *H04W 72/04*  (2009.01)
  *H04B 7/12*  (2006.01)
  *H04W 16/28*  (2009.01)
  *H04B 7/04*  (2017.01)

(52) U.S. Cl.
  CPC ............... *H04B 7/088* (2013.01); *H04B 7/12* (2013.01); *H04L 5/0023* (2013.01); *H04L 5/0048* (2013.01); *H04W 72/048* (2013.01); *H04W 72/082* (2013.01); *H04B 7/04* (2013.01); *H04L 5/005* (2013.01); *H04W 16/28* (2013.01)

(56) References Cited

U.S. PATENT DOCUMENTS

| | | | |
|---|---|---|---|
| 2013/0089000 A1 | 4/2013 | Hansen et al. | |
| 2013/0314280 A1 | 11/2013 | Maltsev et al. | |
| 2014/0162655 A1 | 6/2014 | Hong et al. | |
| 2016/0021549 A1 | 1/2016 | Subramanian et al. | |
| 2016/0065286 A1 | 3/2016 | Kim et al. | |
| 2016/0190707 A1* | 6/2016 | Park | H01Q 1/246 370/334 |
| 2016/0241323 A1* | 8/2016 | Ko | H04B 7/0691 |
| 2016/0344463 A1* | 11/2016 | Kim | H04B 7/0456 |
| 2017/0033853 A1* | 2/2017 | Kim | H04B 7/0417 |
| 2017/0331577 A1* | 11/2017 | Parkvall | H04J 11/0079 |
| 2018/0076857 A1* | 3/2018 | Jung | H04B 7/0408 |
| 2018/0270844 A1* | 9/2018 | Kim | H04B 7/04 |
| 2018/0309496 A1* | 10/2018 | Lee | H04L 5/0044 |
| 2019/0036659 A1* | 1/2019 | Kim | H04B 7/04 |

\* cited by examiner

○ : COMMUNICATION NODE

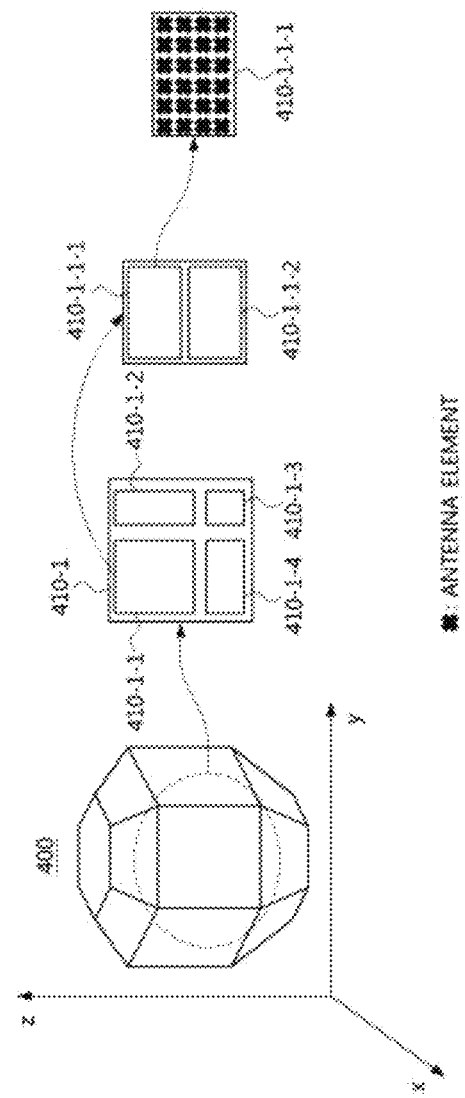

☐ : INNER SECTOR  ☐ : OUTER SECTOR

□ : BEAM ▨ : LOWER SECTOR ▨ : MIDDLE SECTOR □ : UPPER SECTOR

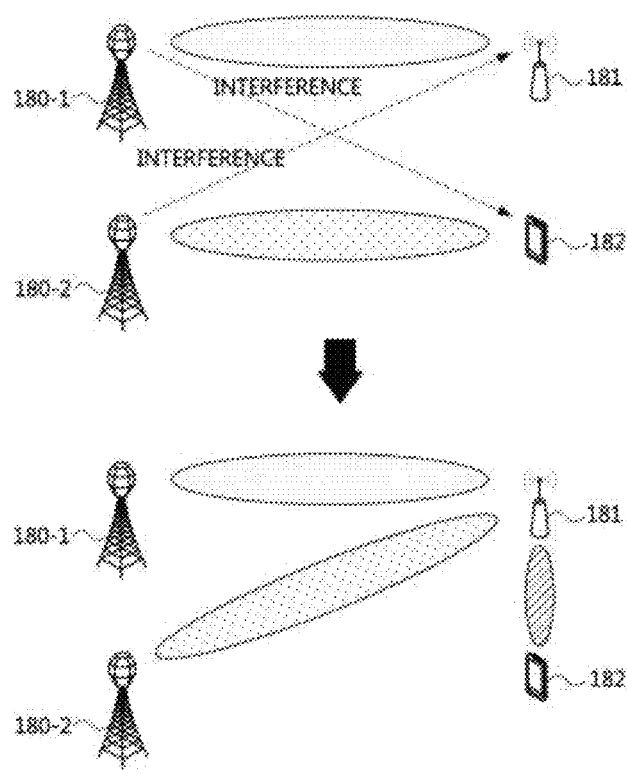

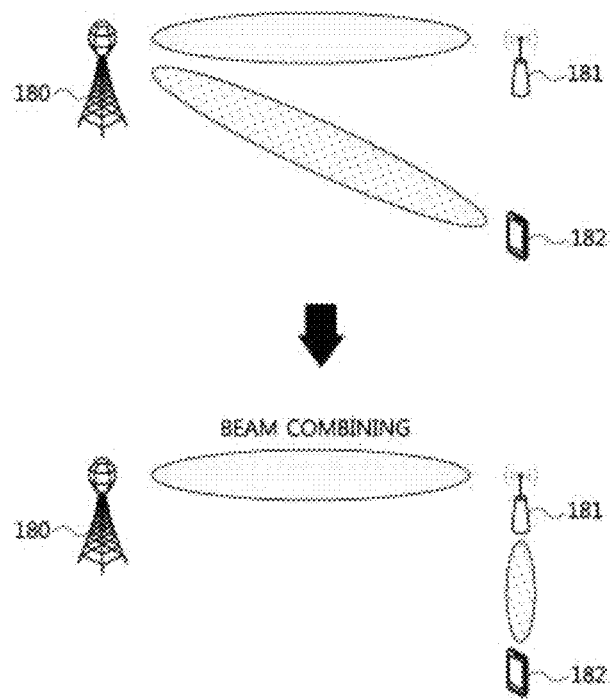

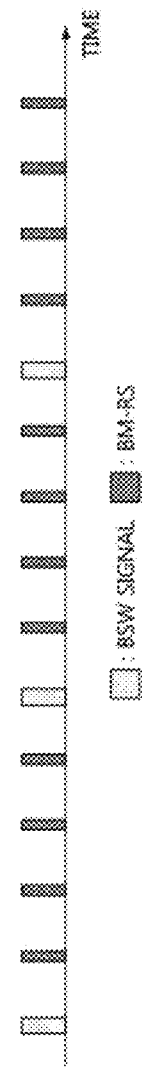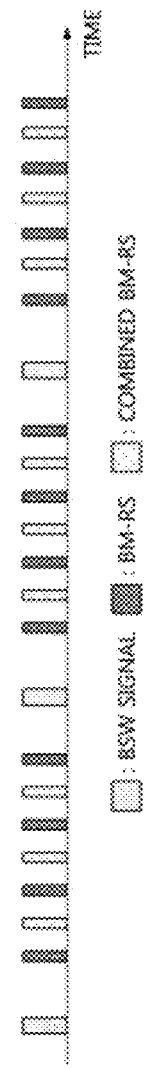
FIG. 26A
FIG. 26B

COMMUNICATION METHOD AND APPARATUS USING MULTIPLE ANTENNAS IN WIRELESS COMMUNICATION SYSTEM

CROSS-REFERENCE TO RELATED APPLICATIONS

This application claims priorities to Korean Patent Applications No. 10-2017-0010669 filed on Jan. 23, 2017 and No. 10-2018-0005500 filed on Jan. 16, 2018 in the Korean Intellectual Property Office (KIPO), the entire contents of which are hereby incorporated by reference.

BACKGROUND

1. Technical Field

The present disclosure relates to wireless communication technologies, and more specifically, to wireless communication technologies for providing enhanced communication services using multiple antennas.

2. Related Art

In a mobile communication system, a terminal (e.g., user equipment (UE)) may transmit and receive data units through a base station. For example, if there is a data unit to be transmitted to a second terminal, a first terminal may generate a message including the data unit to be transmitted to the second terminal, and transmit the generated message to a first base station. The first base station may then receive the message from the first terminal and confirm that a destination of the received message is the second terminal. The first base station may transmit the message to a second base station to which the second terminal, which is the confirmed destination, is connected. The second base station may then receive the message from the first base station and confirm that the destination of the received message is the second terminal. The second base station may transmit the message to the second terminal, which is the confirmed destination. The second terminal may receive the message from the second base station and obtain the data unit included in the received message.

Meanwhile, as the users of the mobile communication system described above increase rapidly, an efficient communication method will be required to enhance the communication service. For example, communications based on multiple antennas may be considered for enhancing communication services. However, if the communications based on multiple antennas is performed, methods for resolving the following issues will be needed.

Reduction of delay in data transmission

Reliability through enhancement on performances of data transmission and retransmission Flexible and scalable service provisioning in consideration of characteristics of terminals (e.g., users) and characteristics of services Provisioning of services to which frequency characteristics and frequency operation regulations are reflected Provisioning of high data transmission rate or large capacity data transmission according to user requirements

SUMMARY

Accordingly, embodiments of the present disclosure provide a method and an apparatus for performing communications through multi-antenna based beamforming in a communication network.

In order to achieve the objective of the present disclosure, a communication method based on hybrid beamforming, performed in a receiver of a communication system, may comprise receiving reference signals from a transmitter of the communication system through beams to which the hybrid beamforming is applied; selecting at least one analog beam having a quality equal to or higher than a preset threshold value among analog beams belonging to the beams, based on the reference signals; selecting at least one digital beam corresponding to the at least one analog beam and having a quality equal to or higher than the preset threshold value among digital beams belonging to the beams, based on the reference signals; and transmitting information indicating at least one of the at least one analog beam and the at least one digital beam to the transmitter.

The selecting at least one analog beam may further comprise selecting at least one horizontal analog beam having a quality equal to or higher than the preset threshold value among horizontal analog beams belonging to the analog beams; and selecting at least one vertical analog beam having a quality equal to or higher than the preset threshold value among vertical analog beams belonging to the analog beams.

The at least one vertical analog beam may be vertically arranged with the at least one horizontal analog beam.

The selecting at least one digital beam may further comprise selecting at least one horizontal digital beam corresponding to the at least one horizontal analog beam and having a quality equal to or higher than the preset threshold value among horizontal digital beams belonging to the digital beams; and selecting at least one vertical digital beam corresponding to the at least one vertical analog beam and having a quality equal to or higher than the preset threshold value among vertical digital beams belonging to the digital beams.

The at least one vertical digital beam may be vertically arranged with the at least one horizontal digital beam.

The reference signals may be received through a combined beam of the transmitter.

The digital beams may be generated by electrical tilting of the analog beams.

The selecting at least one digital beam may further comprise identifying a precoding vector of the at least one digital beam.

In order to achieve the objective of the present disclosure, a communication method based on hybrid beamforming, performed in a transmitting of a communication system, may comprise transmitting reference signals using analog beams and digital beams; receiving, from a receiver of the communication system, information indicating at least one of at least one analog beam and at least one digital beam selected based on the reference signals; and performing communications with the receiver using at least one of the at least one analog beam and the at least one digital beam, wherein an antenna module of the transmitter includes a plurality of beamformers supporting different sectors, each of the plurality of beamformers includes a plurality of panels each of which includes a plurality of antenna elements, and the analog beams and the digital beams are transmitted by a single beamformer.

The reference signals may be transmitted through time-frequency resources other than time-frequency resources configured for interference measurement.

The at least one digital beam may be generated by electrical tilting of the at least one analog beam.

The reference signals may be transmitted through a combined beam into which at least two among the analog beams and the digital beams are combined.

The combined beam may be generated by virtualizing panels belonging to a beamformer to have a single boresight.

In order to achieve the objective of the present disclosure, a receiver of a communication system may comprise a processor and a memory storing at least one instruction executed by the processor. Also, the at least one instruction may be configured to receive reference signals from a transmitter of the communication system through beams to which the hybrid beamforming is applied; select at least one analog beam having a quality equal to or higher than a preset threshold value among analog beams belonging to the beams, based on the reference signals; select at least one digital beam corresponding to the at least one analog beam and having a quality equal to or higher than the preset threshold value among digital beams belonging to the beams, based on the reference signals; and transmit information indicating at least one of the at least one analog beam and the at least one digital beam to the transmitter.

In the selecting of the at least one analog beam, the at least one instruction may be further configured to select at least one horizontal analog beam having a quality equal to or higher than the preset threshold value among horizontal analog beams belonging to the analog beams; and select at least one vertical analog beam having a quality equal to or higher than the preset threshold value among vertical analog beams belonging to the analog beams.

In the selecting of the at least one digital beam, the at least one instruction may be further configured to select at least one horizontal digital beam corresponding to the at least one horizontal analog beam and having a quality equal to or higher than the preset threshold value among horizontal digital beams belonging to the digital beams; and select at least one vertical digital beam corresponding to the at least one vertical analog beam and having a quality equal to or higher than the preset threshold value among vertical digital beams belonging to the digital beams.

The at least one vertical analog beam may be vertically arranged with the at least one horizontal analog beam, and the at least one vertical digital beam may be vertically arranged with the at least one horizontal digital beam.

The reference signals may be received through a combined beam of the transmitter.

The digital beams may be generated by electrical tilting of the analog beams.

In the selecting of the at least one digital beam, the at least one instruction may be further configured to identify a precoding vector of the at least one digital beam.

According to the embodiments of the present disclosure, enhanced communication services can be provided in a communication system. In particular, when communications are performed based on multiple antennas, an optimal beam (e.g., analog beam and/or digital beam) can be selected through a beam search procedure so that the performance of the communications can be improved. Also, a beam quality can be measured through a beam measurement procedure, and communications can be performed using a beam having an optimal quality, so that the performance of the communications can be improved. Also, interference between the beams can be measured through a beam interference measurement procedure, and the interference can be controlled based on the measurement result, so that performance of the communications can be improved.

BRIEF DESCRIPTION OF DRAWINGS

Embodiments of the present disclosure will become more apparent by describing in detail embodiments of the present disclosure with reference to the accompanying drawings, in which:

FIG. 4 is a conceptual diagram illustrating a first embodiment of an antenna module;

FIG. 18A is a conceptual diagram illustrating a first embodiment of a beam transmission method through a relay;

FIG. 18B is a conceptual diagram illustrating a second embodiment of a beam transmission method through a relay;

FIG. 26A is a timing chart illustrating a first embodiment of a beam measurement signal transmission method;

FIG. 26B is a timing chart illustrating a second embodiment of a beam measurement signal transmission method.

DETAILED DESCRIPTION

Figure 1:
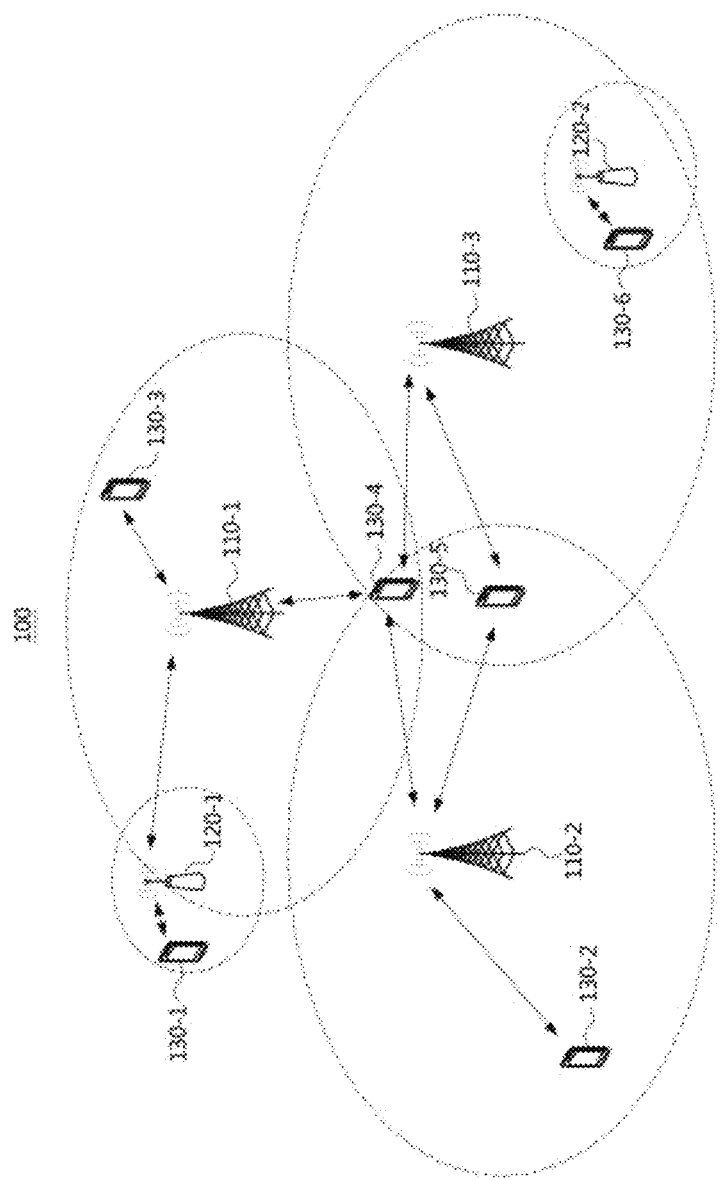
FIG. 1 is a conceptual diagram illustrating a first embodiment of a communication system.

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein.

Accordingly, while the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in greater detail with reference to the accompanying drawings. In order to facilitate general understanding in describing the present disclosure, the same components in the drawings are denoted with the same reference signs, and repeated description thereof will be omitted.

A communication system to which embodiments of the present disclosure are applied will be described. The communication system may be a 4G communication system (e.g., a long-term evolution (LTE) communication system, an LTE-A communication system), a 5G communication system (e.g. a new radio (NR) communication system, or the like. The 4G communication system can support communications in a frequency band of 6 GHz or less, and the 5G communication system can support communications in a frequency band of 6 GHz or less as well as a frequency band of 6 GHz or more. The communication system to which embodiments according to the present disclosure are applied are not restricted to what will be described below. That is, the embodiments according to the present disclosure may be applied to various communication systems. Here, the term 'communication system' may be used with the same meaning as the term 'communication network.'

FIG. 1 is a conceptual diagram illustrating a first embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. Also, the communication system 100 may comprise a core network (e.g., a serving gateway (S-GW), a packet data network (PDN) gateway (P-GW), a mobility management entity (MME), and the like).

The plurality of communication nodes may support $4^{th}$ generation (4G) communication (e.g., long term evolution (LTE), LTE-advanced (LTE-A)), or $5^{th}$ generation (5G) communication defined in the $3^{rd}$ generation partnership project (3GPP) standard. The 4G communication may be performed in a frequency band below 6 gigahertz (GHz), and the 5G communication may be performed in a frequency band above 6 GHz. For example, for the 4G and 5G communications, the plurality of communication nodes may support at least one communication protocol among a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, and a space division multiple access (SDMA) based communication protocol. Also, each of the plurality of communication nodes may have the following structure.

Figure 2:
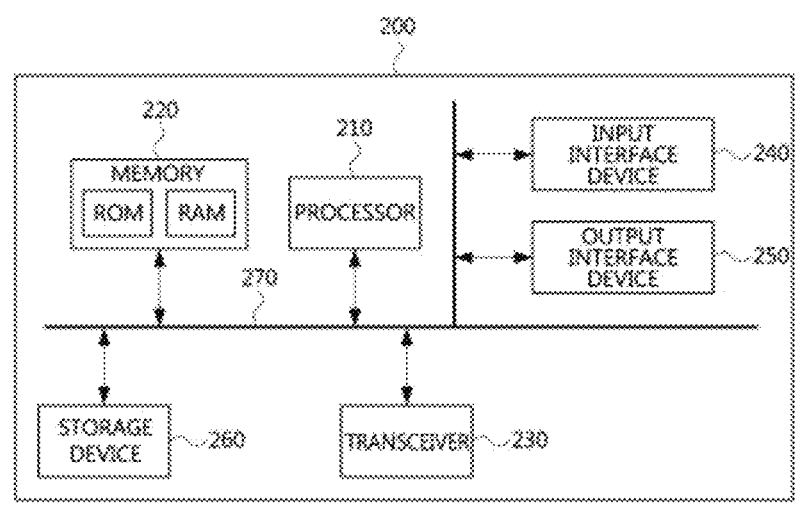
FIG. 2 is a block diagram illustrating a first embodiment of a communication node constituting a communication system.

FIG. 2 is a block diagram illustrating a first embodiment of a communication node constituting a communication system.

Referring to FIG. 2, a communication node 200 may comprise at least one processor 210, a memory 220, and a transceiver 230 connected to a network for performing communications. Also, the communication node 200 may further comprise an input interface device 240, an output interface device 250, a storage device 260, and the like. Each component included in the communication node 200 may communicate with each other as connected through a bus 270. However, each of the components included in the communication node 200 may be connected to the processor 210 via a separate interface or a separate bus rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, a evolved Node-B (eNB), a base transceiver station (BTS), a radio base station, a radio transceiver, an access point, an access node, or the like. Also, each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul link or a non-ideal backhaul link, and exchange information with each other via the ideal or non-ideal backhaul link. Also, each of the plurality of base stations 110-1, 110-2, 110-3, 120-1, and 120-2 may be connected to the core network through the ideal or non-ideal backhaul link. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Also, each of the plurality of base stations 110-1, 110-2, 110-3, 120-1, and 120-2 may support a multi-input multi-output (MIMO) transmission (e.g., a single-user MIMO (SU-MIMO), a multi-user MIMO (MU-MIMO), a massive MIMO, or the like), a coordinated multipoint (CoMP) transmission, a carrier aggregation (CA) transmission, a transmission in unlicensed band, a device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2). For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Meanwhile, an enhanced communication service providing apparatus in the embodiments of the present disclosure may be an enhanced mobile broadband (eMBB) device, a low latency enabled (LL) device, a coverage enhanced (CE) device, or a low complexity (LC) device. The eMBB device may support transmission and reception of large capacity data. The LL device may support functions of reducing transmission delays. The CE device may support enhancement of transmission distances. The LC device may support complexity improvement functions. The device (e.g., eMBB device, LL device, CE device, LC device, etc.) that provides enhanced communication services in the embodiments described below may be referred to as 'S-device'.

The S-device may be a device supporting a transmission function (e.g., a base station in a downlink communication procedure, a terminal in an uplink communication procedure, etc.), a device supporting a reception function (e.g., a terminal in a downlink communication procedure, a base station in an uplink communication procedure, etc.), a device supporting a relay function (e.g., a relay, etc.), and the like. Also, the S-device may be located in an apparatus having mobility (e.g., a car, a train, an airplane, a drone, etc.).

The meaning of the terms used in the following embodiments may be defined as follows.

$A_A$: array antenna pattern (dB)
$A_E$: composite array antenna pattern (dB)
$A_m$: front-to-back ratio
$A_{E,H}(\varphi)$: horizontal radiation pattern of a radiation element
$A_{E,V}(\theta)$: vertical radiation pattern of a radiation element (e.g., a vertical radiation pattern of a radiation element having an offset of 90 degrees to a point perpendicular to an array antenna)
$d_c^h$: horizontal covered degree by a radio frequency (RF) chain
$d_c^v$: vertical covered degree by a radio frequency (RF) chain
$d_{g,H}$: distance between panels in horizontal direction
$d_{g,V}$: distance between panels in horizontal direction
$d_s^h$: horizontal covered degree of a sector
$d_s^v$: vertical covered degree of a sector
$d_{t_h}$: distance between antenna elements of a transmitter in the horizontal direction
$d_{t_v}$: distance between antenna elements of a transmitter in the vertical direction
$E_{m,n}(\theta, \varphi)$: complex gain of a radiation element at m-th column and n-th row (e.g., a complex gain with a phase shift according to array antenna arrangement)
$G_{E,max}$: maximum directional gain of radiation element (dB) (e.g., the maximum directional gain may be 8 dBi)
$N_s^h$: the number of horizontal sectors at azimuth angle (e.g., horizontal axis)
$N_s^v$: the number of vertical sectors at zenith angle (e.g., vertical axis)
$N_s$ ($=N_s^h N_s^v$): the number of sectors served by a transmitter
$N_t^C$ ($=N_{t_h}^C N_{t_v}^C$): the number of panels in a beamformer
$N_{t_h}^C$: the number of panels in the horizontal direction (row) in a beamformer (>0)
$N_{t_v}^C$: the number of panels in the vertical direction (column) in a beamformer (>0)
$N_b$ ($=N_b^h N_b^v$): the number of beams available by an RF chain
$N_b^h$: the number of beams available by an RF chain in the horizontal direction
$N_b^v$: the number of beams available by an RF chain in the vertical direction
$N_r^a$ ($=N_{r_h}^a N_{r_v}^a$): the number of antenna elements connected by an RF chain of a receiver (e.g., an RF chain in one panel)
$N_{r_h}^a$: the number of horizontal antenna elements in one panel of a receiver (>0)
$N_{r_v}^a$: the number of vertical antenna elements in one panel of a receiver (>0)
$N_t^a$ ($=N_{t_h}^a N_{t_v}^a$): the number of antenna elements connected by an RF chain of a transmitter (e.g., an RF chain in one panel)
$N_{t_h}^a$: the number of horizontal antenna elements in one panel of a transmitter (>0)
$N_{t_v}^a$: the number of vertical antenna elements in one panel of a transmitter (>0)
$P_E(\theta, \varphi)$: magnitude of an element pattern
$SLA_v$: side-lobe level limit
$\varphi$: azimuth angle (e.g., defined between −180° and 180°)
$\theta$: elevation angle in one direction (e.g., the elevation angle is defined between 0° and 180°, and 90° of the elevation angle indicates perpendicular to an array antenna)
$\theta_{3dB}$: vertical 3 dB beamwidth of an antenna at a transmitter
$\varphi_{3dB}$: horizontal 3 dB beamwidth of an antenna at a transmitter
$\lambda$: wavelength corresponding to an operating carrier frequency
$\rho$: signal correlation coefficient Enhanced Communication Service Providing Methods At least one of the following methods may be used to provide enhanced communication services (e.g., communication services supporting transmission of large capacity data, communication services supporting high data rates, etc.) according to user's needs.

Method 1: transmission rate enhancement
Method 2: spectral efficiency enhancement
Method 3: provision of a system bandwidth suited to service requirements
Method 4: provision of connections suited to service requirements
Method 5: retransmission for enhancement of reliability, and prevention of retransmissions through improved transmission procedures
Method 6: provision of a wide coverage
Method 7: transmission considering operating frequency characteristics Transmission Rate Enhancement The transmission rate may be enhanced by improving a signal processing performance. In case that there are regulations on frequency operations according to spectral uses, a communication service may be provided within a range satisfying the regulations. For example, the transmission rate may be improved when a transmission based on a high-order modulation and coding scheme (MCS) (e.g., 1024 quadrature amplitude modulation (QAM)). However, a radio signal may have a loss due to an environment such as a free space loss, a rainfall, an atmosphere, and the like. Particularly, in case of a frequency band of 6 GHz or more (hereinafter, referred to as a 'mmWave band'), the loss due to the environment (e.g., the rainfall, the atmosphere, etc.) should be considered.

Therefore, in order to use the high-order MCS in the mmWave band, a MCS level may be controlled adaptively according to the environment (e.g., the rainfall, the atmosphere, etc.). For example, whether to perform a link adaptation, the MCS level, or the like may be configured according to a possibility of rain (e.g., 99.5%, 99.9%, 99.95%, 99.995%, 99.999%, etc.) at a specific time (e.g., period).

Similarly to a carrier aggregation (CA) scheme, communication services may be provided based on a combination of two or more wireless links. For example, communication services may be provided by combining a low-frequency link (e.g., a microwave link below 6 GHz) and a high-frequency link (e.g., a mmWave link above 6 GHz). In this case, the wireless links may be combined in consideration of channel characteristics of each of the low-frequency link and the high-frequency link. Also, if the quality of one wireless link (e.g., the high-frequency link) becomes poor, the communication services may be provided using another wireless link (e.g., the low-frequency link). For example, a wireless link that is robust to changes in the environment among the combined wireless links may be used, and a wireless link (e.g., the low-frequency link in the case of long range transmissions) selected based on the transmission distance of the signal may be used.

Spectral Efficiency Enhancement

The spectral efficiency may be enhanced through multiplexing. The multiplexing may be performed through a plurality of layers and links. For example, the multiplexing may be performed based on multiple antennas and multiple transmission points. The proper arrangement (e.g., spacing between antennas) of the multiple antennas forming the plurality of layers and links for the multiplexing may be required. Also, control and cooperation between the multiple transmission points may be required. Alternatively, a received signal quality may be improved through a proper combination of received signals according to a difference between a plurality of paths.

Suitable System Bandwidth Provision

A wide system bandwidth may be required to transmit large capacity data. The wide system bandwidth may be provided through a combination of multiple wireless links. The large capacity data may be transmitted over a wide system bandwidth in a license-exempt/public frequency band. However, the maximum system bandwidth may be limited to 1 to 2 GHz or less due to hardware limitation of a communication node (e.g., base station, terminal, S-device). For coexistence between communication systems or coexistence between communication nodes, the system bandwidth may be divided.

Provision of Many Connections

In a communication system, a point-to-point (P2P) communication and a point-to-multipoint (P2MP) communication may be supported. In this case, many connections may be supported through limited radio resources.

Reliability Enhancement

Data may not be transmitted successfully due to the characteristics of a wireless channel. In order to solve this problem, a robust and reliable transmission procedure, a transmission error correction procedure, and a data retransmission procedure may be performed. A transmitter may transmit data to a receiver, and the receiver may transmit a response (e.g., an acknowledgment (ACK), or a negative ACK (NACK)) to the data obtained from the transmitter to the transmitter. The transmitter may determine whether or not to perform the data retransmission procedure based on the response received from the receiver. Alternatively, for improved reliability, the transmitter may retransmit the same data without the response (e.g., ACK, NACK). The reliability can be improved by transmitting data through a plurality of links or a plurality of transmission points.

Coverage Extension

In order to provide a wide coverage, the transmitter may transmit signals using high transmit power. As a transmission distance increases, the received signal strength may be reduced, and the receiver may provide wide coverage by processing signals with low received signal strength. The coverage may be extended through multi-hop transmission by relays. The coverage may be extended by transmitting signals in specific directions using high transmit power. In this case, a directional antenna may be used and a plurality of antennas may be arranged such that the signal is transmitted in a specific direction. Also, the communication performance can be improved by applying interference cancellation techniques.

Communication Methods Based on Multiple Antennas

Next, a method of improving spectral efficiency, a method of extending coverage, and the like based on multiple antennas will be described.

Beamforming

Beamforming may be performed through directional antennas, antenna arraying, beam radiation, and the like. Through beamforming, the coverage for a specific direction can be extended. However, for receivers having mobility, beamforming may also be performed in all directions. Also, since the communication performance due to beamforming may be degraded if a position of the receiver cannot be accurately predicted, the beamforming may be performed in all directions to solve this problem.

Figure 3:
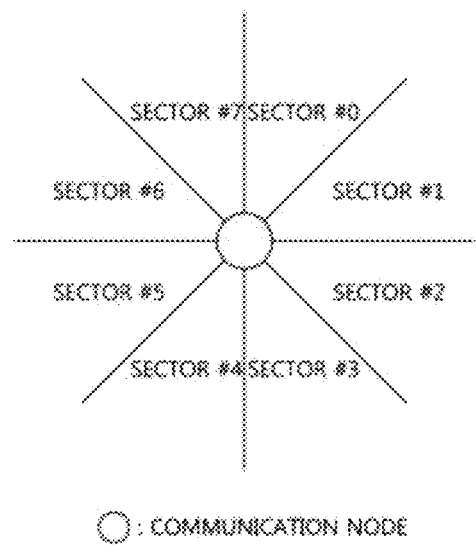
FIG. 3 is a conceptual diagram illustrating a first embodiment of a beamforming-based transmission method.

FIG. 3 is a conceptual diagram illustrating a first embodiment of a beamforming-based transmission method.

Referring to FIG. 3, a communication node (e.g., a base station, a terminal, an S-device, etc.) may perform beamforming independently in each of sectors. In case that the communication node includes an antenna, the communication node may perform beamforming in each of the sectors (e.g., sectors #0 to #7) using the antenna. Alternatively, in case that the communication node includes a plurality of antennas, the communication node may simultaneously perform beamforming in a plurality of sectors (e.g., sectors #0 to #7) using the plurality of antennas.

FIG. 4 is a conceptual diagram illustrating a first embodiment of an antenna module.

Referring to FIG. 4, in order to provide communication services in each of the sectors (e.g., sectors #0 to #7 shown in FIG. 3), an antenna module 400 may include a plurality of beamformers (e.g., 18 beamformers 410-1 to 410-18). One beamformer may be disposed on one surface of the antenna module 400. For example, the beamformers #2 to #6 (i.e., 410-2 to 410-6) may be disposed on surfaces located on an axis horizontal to the beamformer #1 (e.g., the axis horizontal to the xy plane), the beamformers #7 to #12 (i.e., 410-7 to 410-12) may be disposed on the upper surfaces of the surface on which the beamformer #1 (i.e., 410-1) is disposed, with respect to a vertical axis (e.g., the axis vertical to the xy plane), and the beamformers #13 to #18 (i.e., 410-13 to 410-18) may be disposed on the lower surfaces of the surface on which the beamformer #1 (i.e., 410-1) is disposed, with respect to the vertical axis (e.g., the axis vertical to the xy plane). One beamformer may form at least one beam and may be mapped to one sector. For example, one beamformer may provide communication services in one sector.

Each of the beamformers 410-1 through 410-18 may include at least one panel (e.g., antenna panel), one panel may include at least one array antenna, and the array antenna may include at least one antenna element. The arrangement of the panel, array antenna, and antenna element may be the same in all the beamformers 410-1 through 410-18 of the antenna module 400. Alternatively, the arrangement of the panel, array antenna, and antenna element may be independent in each of the beamformers 410-1 through 410-18. For example, the beamformer #1 410-1 may include 4 panels 410-1-1 through 410-1-4, the panel 410-1-1 may include 2 array antennas 410-1-1-1 and 410-1-1-2, and the array antenna 410-1-1-1 may comprise 24 antenna elements.

Meanwhile, a beamformer disposed on the horizontal axis may be referred to as a 'horizontal beamformer', and $N_h$ horizontal beamformers may be disposed in the antenna module according to embodiments of the present disclosure. The $N_h$ horizontal beamformers may be used for communications with a communication node (e.g., base station, terminal, S-device, etc.) located at the same or similar height with that of the antenna module. Also, a beamformer disposed on the vertical axis may be referred to as a 'vertical beamformer', and $N_v$ vertical beamformers may be disposed in the antenna module according to embodiments of the present disclosure. The $N_v$ vertical beamformers may be used for communications with a communication node (e.g., base stations, terminals, S-devices, etc.) located at a different height with that of the antenna module. Each of $N_h$ and $N_v$ may be an integer of 1 or more.

When an area where the antenna module provides communication services (hereinafter referred to as a 'service area') is spherical, an angle of the horizontal sector in which one horizontal beamformer provides communication services on the horizontal axis may be $2\pi/N_h$, and an angle of the vertical sector in which one vertical beamformer provides communication services in the vertical axis may be '$\pi/N_v$'. For example, when a reference point is 0°, coordinates (e.g., angles) of the horizontal sectors may be defined based on Equation 1 below, and coordinates (e.g., angles) of the vertical sectors may be defined based on Equation 2 below.

$$\left[-\frac{2\pi}{2N_h}\left(=2\pi-\frac{2\pi}{2N_h}\right), \frac{2\pi}{2N_h}\right], \left[\frac{2\pi}{N_h}-\frac{2\pi}{2N_h}, \frac{2\pi}{N_h}+\frac{2\pi}{2N_h}\right],$$
$$\cdots \left[\frac{(N_h-1)2\pi}{N_h}-\frac{2\pi}{2N_h}, \frac{(N_h-1)2\pi}{N_h}+\frac{2\pi}{2N_h}\right]$$
[Equation 1]

$$\left[0, \frac{\pi}{N_v}\right], \left[\frac{\pi}{N_v}, \frac{2\pi}{N_v}\right], \cdots \left[\frac{(N_v-1)\pi}{N_v}, \pi\right]$$
[Equation 2]

Figure 5A:
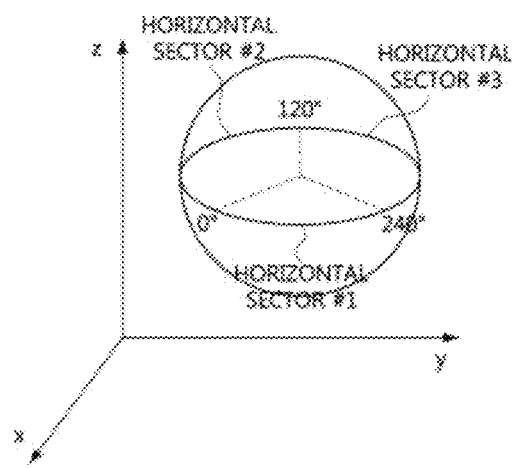
FIG. 5A is a conceptual diagram illustrating a first embodiment of a horizontal sector in a service area.
Figure 5B:
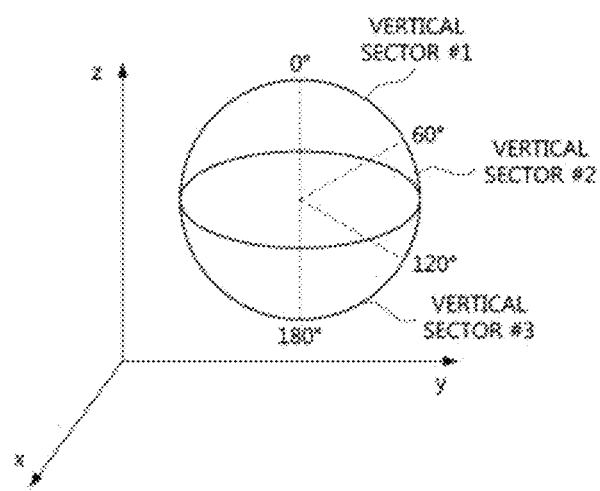
FIG. 5B is a conceptual diagram illustrating a first embodiment of a vertical sector in a service area.
Figure 5C:
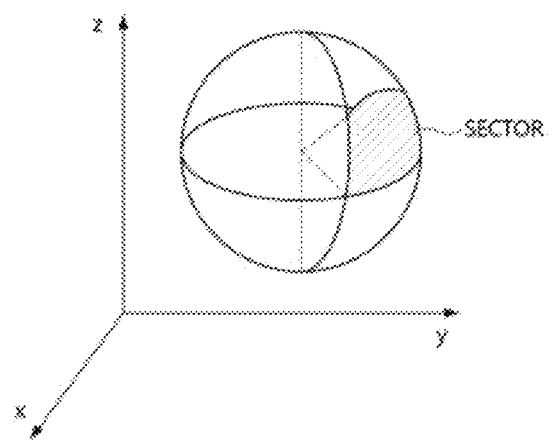
FIG. 5C is a conceptual diagram illustrating a first embodiment of a sector configuration in a service area.

FIG. 5A is a conceptual diagram illustrating a first embodiment of a horizontal sector in a service area, FIG. 5B is a conceptual diagram illustrating a first embodiment of a vertical sector in a service area, and FIG. 5C is a conceptual diagram illustrating a first embodiment of a sector configuration in a service area.

Referring to FIGS. 5A to 5C, there may be 3 horizontal sectors in a service area, and 3 vertical sectors in the service area. According to the combination of 3 horizontal sectors and 3 vertical sectors, there may be 9 sectors in the service area.

Meanwhile, a plurality of beamformers may provide communication services in one sector. Alternatively, one beamformer may provide communication services in a plurality of sectors. When beams are distinguished within one sector, if a beam change is required according to movement of a terminal, the corresponding beam may be changed without changing the sector.

Figure 6:
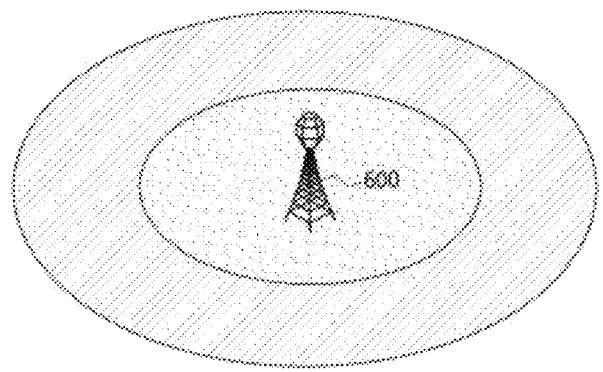
FIG. 6 is a conceptual diagram illustrating a second embodiment of a sector configuration in a service area.

FIG. 6 is a conceptual diagram illustrating a second embodiment of a sector configuration in a service area.

Referring to FIG. 6, an inner sector and an outer sector may be configured according to a transmission distance from a base station 600 in a service area. A separate beamformer may be operated for each of the inner sector and the outer sector.

Figure 7:
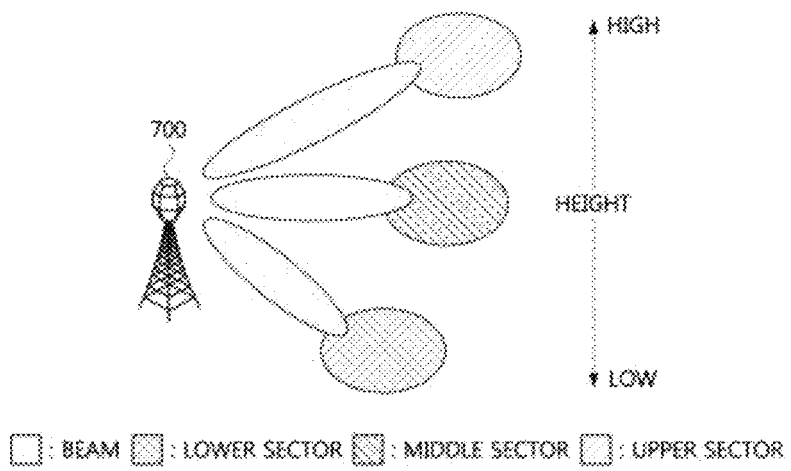
FIG. 7 is a conceptual diagram illustrating a third embodiment of a sector configuration in a service area.

FIG. 7 is a conceptual diagram illustrating a third embodiment of a sector configuration in a service area.

Referring to FIG. 7, a service area may be divided into a lower sector, a middle sector, and an upper sector according to a height of a receiver (e.g., a terminal). A base station 700 may provide communication services in the lower sector, the middle sector, and the upper sector, respectively.

Figure 8:
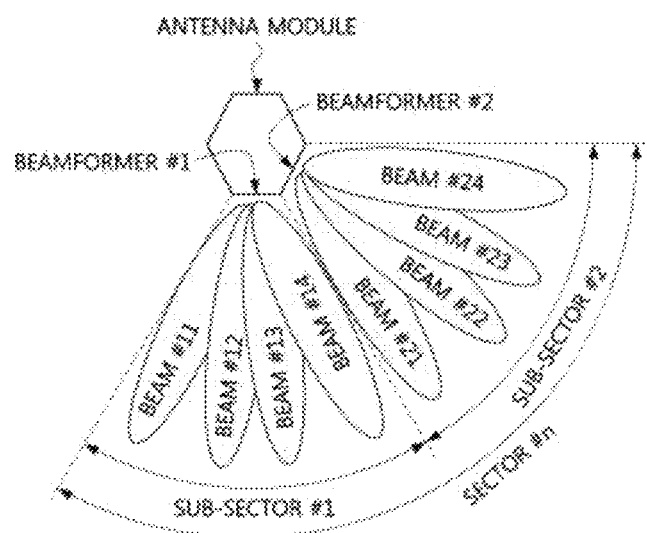
FIG. 8 is a conceptual diagram illustrating a fourth embodiment of a sector configuration in a service area.

FIG. 8 is a conceptual diagram illustrating a fourth embodiment of a sector configuration in a service area.

Referring to FIG. 8, when a plurality of beamformers (e.g., beamformers #1 and #2) belonging to an antenna module of a transmitter provides communication services to one sector, a beam identifier (ID) for uniquely identifying each of beams (e.g., beams #11 to #14 and beams #21 to #24) generated by the plurality of beamformers (e.g., the beamformers #1 and #2) may be configured.

Alternatively, a beam ID may be configured to uniquely identify each of the beams in one beamformer (e.g., a sub-sector supported by the one beamformer). For example, a beam ID for uniquely identifying each of the beams #11 to #14 may be configured in a sub-sector #1, and a beam ID for uniquely identifying each of the beams #21 to #24 may be configured in a sub-sector #2. The beams between the beamformers (e.g., the beamformers #1 and #2) may be identified according to the sub-sectors supported by the beamformers.

Figure 9:
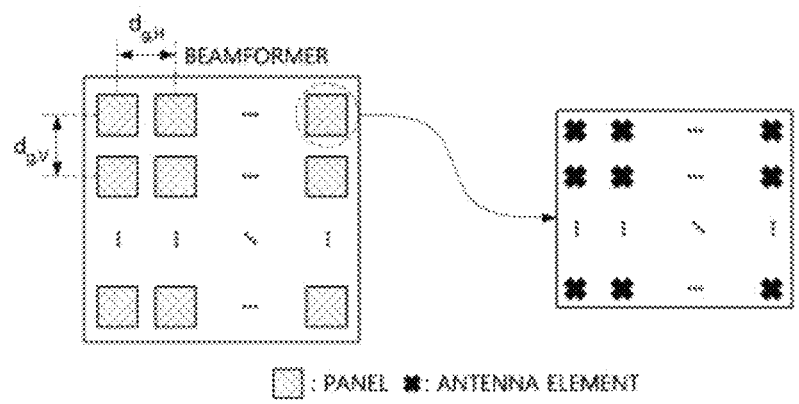
FIG. 9 is a conceptual diagram illustrating a first embodiment of a panel in a beamformer.

FIG. 9 is a conceptual diagram illustrating a first embodiment of a panel in a beamformer.

Referring to FIG. 9, a beamformer may include a plurality of panels, and the plurality of panels may be arranged independently. Each of the plurality of panels may generate independent beam and may provide communication services in a different service area. The plurality of service areas for the respective panels may be operated as follows. Here, a 'service area' may indicate a 'sector', and a 'sub-service area' may indicate a 'sub-sector'.

Operation scheme 1: A service area served by one beamformer is divided into sub-service areas each of which is independently served by each of the panels belonging to the one beamformer.

Operation scheme 2: A service area is set up by the panels belonging to one beamformer.

When the service area served by the beamformer is configured to be the service area (e.g., $2\pi$:Nh and $\pi$/Nv) shown in FIGS. 5A to 5C, the corresponding service area may be configured and operated as a service area served by panels (e.g., 'service area of one beamformer=service area of one panel') or a service area served by each of the panels (e.g., 'service area of one beamformer/service area of one panel').

Meanwhile, the antenna elements in the panel may be arranged spatially independently, and a beam may be generated by the antenna elements disposed in the panel. By adjusting the distances $d_{g,H}$ and $d_{g,V}$ between the panels, the beam of each of the panels may be generated independently. Alternatively, the communication services may be provided through a combined beam between the panels by adjusting the distances $d_{g,H}$ and $d_{g,V}$ between the panels. In this case, the arrangement of the antenna elements in the panels may be the same.

$N_{t_h}^c$ panels may be placed on the horizontal axis of one beamformer and $N_{t_v}^c$ panels may be placed on the vertical axis of one beamformer. That is, one beamformer may include $N_t^c$ ($=N_{t_h}^c N_{t_v}^c$) panels. One panel may be connected to at least one RF chain. In this case, the RF may refer to the panel. $N_{t_h}^a$ antenna elements may be placed on the horizontal axis of one panel, and $N_{t_v}^a$ antenna elements may be arranged on the vertical axis of one panel. That is, one panel may include $N_t^a$ ($=N_{t_h}^a N_{t_v}^a$) antenna elements. The horizontal axis spacing between adjacent panels may be $d_{g,H}$, and the vertical axis spacing between adjacent panels may be $d_{g,V}$. The panel may be polarized to improve the transmission rate. $\theta_{max}$ may indicate the maximum vertical tilting angle (e.g., down tilting angle, up tilting angle) of each of the panels. For example, $\theta_{max}$ may be 102°. $\varphi_{max}$ may indicate the maximum horizontal tilting angle of each of the panels.

Meanwhile, in embodiments of the present invention, a beamwidth may be a half-power beamwidth (HPBW) having a half intensity as compared to a main lobe. The antenna module may generate a radiation pattern based on Table 1 below.

TABLE 1

| Parameter | Values |
| --- | --- |
| Antenna element vertical radiation pattern (dB) | $A_{E,V}(\theta'') = -\min\left\{12\left(\frac{\theta''-90°}{\theta_{3dB}}\right)^2, SLA_V\right\}, \theta_{3dB} = 65°, SLA_V = 30\text{ dB}$ |
| Antenna element horizontal radiation pattern (dB) | $A_{E,H}(\varphi'') = -\min\left\{12\left(\frac{\varphi''}{\varphi_{3dB}}\right)^2, A_m\right\}, \varphi_{3dB} = 65°, A_m = 30\text{ dB}$ |
| Combining method for 3D antenna element pattern (dB) | $A''(\theta'', \varphi'') = -\min\{-[A_{E,H}(\varphi'') + A_{E,V}(\theta'')], A_m\}$ |
| Maximum directional gain of an antenna element $G_{E,max}$ | 8 dBi |
| Equation of magnitude of element patterns | $20 \times \log_{10}(P_E(\theta, \varphi)) = G_{E,Max} + A''(\theta'', \varphi'')$ |
| Composite Array radiation pattern in dB $A_A(\theta, \varphi)$ | $A_A(\theta, \varphi) = A_E(\theta, \varphi) + 10\log_{10}\left[1 + \rho\cdot\left(\left|\sum_{m=1}^{N_{t_h}^a}\sum_{n=1}^{N_{t_v}^a} f_{m,n}^a \cdot f_{m,n}^d\right|^2 - 1\right)\right]$ | the steering matrix components are given by $$f_{m,n}^a = e^{j\frac{2\pi}{\lambda}\{(n-1)d_{t_v}\cos\theta_i^a + (m-1)d_{t_h}\sin\theta_i^a\sin\varphi_i^a\}}$$

$$m = 1, 2, \ldots, N_{t_h}^a$$

$$n = 1, 2, \ldots, N_{t_v}^a$$

the weighting factor (if electrical tilting is applied) is given by $$f_{m,n}^d = \frac{1}{\sqrt{N_{t_h}^a N_{t_v}^a}} e^{j\frac{2\pi}{\lambda}\{(n-1)d_{t_v}\sin\theta_i^e - (m-1)d_{t_h}\cos\theta_i^e\sin\varphi_i^e\}}$$

$$m = 1, 2, \ldots, N_{t_h}^a$$

$$n = 1, 2, \ldots, N_{t_v}^a$$

$$F_A^i = \begin{bmatrix} f_{1,1}^a(\varphi_i^a, \theta_i^a), f_{1,2}^a(\varphi_i^a, \theta_i^a), \ldots, \\ f_{1,N_{t_v}^a}^a(\varphi_i^a, \theta_i^a), \ldots, f_{m,n}^a(\varphi_i^a, \theta_i^a), \ldots, \\ f_{N_{t_h}^a,1}^a(\varphi_i^a, \theta_i^a), \ldots, f_{N_{t_h}^a,N_{t_v}^a}^a(\varphi_i^a, \theta_i^a) \end{bmatrix}^T \quad \text{[Equation 3]}$$

Figure 10:
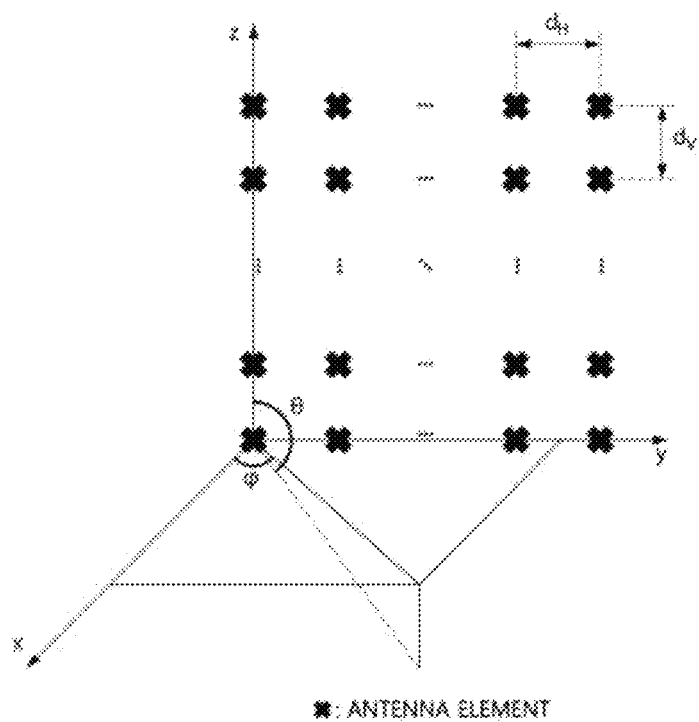
FIG. 10 is a conceptual diagram illustrating a first embodiment of a 2D uniform rectangular array (URA) antenna disposed in a panel.

FIG. 10 is a conceptual diagram illustrating a first embodiment of a 2D uniform rectangular array (URA) antenna disposed in a panel.

Referring to FIG. 10, $N_{t_h}^a$ antenna elements may be disposed on a horizontal axis (e.g., an axis horizontal to the xy plane) of a 2D URA antenna, and $N_{t_v}^a$ antenna elements may be disposed on a vertical axis (e.g., an axis vertical to the xy plane) of the 2D URA antenna. The horizontal spacing between adjacent antenna elements may be $d_H$, and the vertical spacing between adjacent antenna elements may be $d_V$.

An array factor $\tilde{F}$ may be applied depending on the arrangement of the antenna elements. According to the arrangement of the antenna elements in the 2D URA antenna, a phase shift according to Equation 3 below may be applied to analog beamforming (ABF).

-continued $$f_{m,n}^a(\varphi_i^a, \theta_i^a) = e^{j\frac{2\pi}{\lambda}\{(n-1)d_{t_v}\cos\theta_i^a + (m-1)d_{t_h}\sin\theta_i^a\sin\varphi_i^a\}}$$

$$m = 1, 2, \ldots, N_{t_h}^a$$

$$n = 1, 2, \ldots, N_{t_v}^a$$

In the horizontal axis, the antenna module (e.g., panels, array antennas, antenna elements belonging to the antenna module) may be steered to a maximum $\varphi$ (e.g., $0 < \varphi$) with respect to a boresight. In the vertical axis, the antenna module (e.g., panels, array antennas, antenna elements belonging to the antenna module) may be steered to a maximum $\theta$ (e.g., $0 \le \pi/2$) with respect to the boresight.

Meanwhile, in case that electric tilting is applied, baseband signals may be processed based on Equation 4 below.

$$F_E^i = \begin{bmatrix} f_{1,1}^e(\varphi_i^e, \theta_i^e), \ldots, f_{1,N_{t_v}^a}^e(\varphi_i^e, \theta_i^e), \ldots, f_{m,n}^e(\varphi_i^e, \theta_i^e), \ldots, \\ f_{N_{t_h}^a,1}^e(\varphi_i^e, \theta_i^e), \ldots, f_{N_{t_h}^a,N_{t_v}^a}^e(\varphi_i^e, \theta_i^e) \end{bmatrix}^T$$ [Equation 4]

$$f_{m,n}^e(\varphi_i^e, \theta_i^e) = \frac{1}{\sqrt{N_{t_h}^a N_{t_v}^a}} e^{j\frac{2\pi}{\lambda}\{(n-1)d_{t_v}\cos\theta_i^e - (m-1)d_{t_h}\cos\theta_i^e \sin\varphi_i^e\}}$$

$\varphi_{e,i}$: electrical horizontal—tilting
$\theta_{e,i}$: electrical down—tilting
m=1, 2, . . . , $N_{t_h}{}^a$
n=1, 2, . . . , $N_{t_v}{}^a$ Meanwhile, antenna gains and beamwidths according to the beamforming may be as follows.

Figure 11:
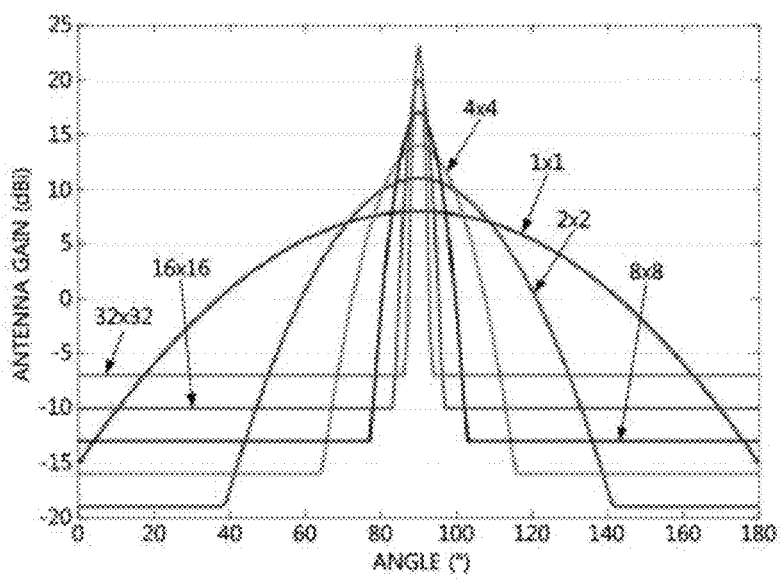
FIG. 11 is a graph illustrating a first embodiment of antenna gains and beam patterns according to beamforming.

FIG. 11 is a graph illustrating a first embodiment of antenna gains and beam patterns according to beamforming.

Referring to FIG. 11, each of the '1×1', '2×2', '4×4', '8×8', '16×16', and '32×32' may indicate the number of antenna elements performing beamforming. The beamforming may be performed through alignment of a plurality of antenna elements to improve the transmission rate. The greater the number of antenna elements used for the beamforming, the greater the antenna gain, and the beamwidth can be reduced. Thus, beam patterns for the beamforming, rapid device/beam discovery, and a beam tracking procedure for efficient antenna alignment and data transmission/reception procedure may be required.

Meanwhile, the data transmission/reception procedure according to beamforming may be performed based on the below-described beamforming operation state transition diagram.

Figure 12:
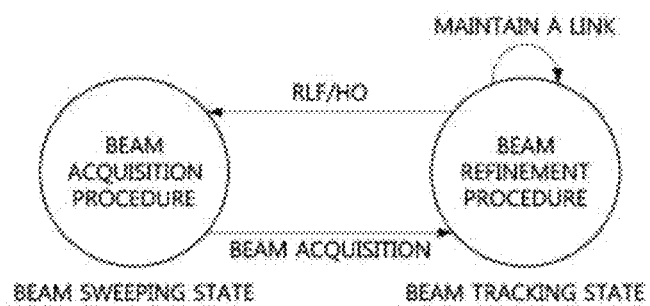
FIG. 12 is a conceptual diagram illustrating a first embodiment of a beamforming operation state transition diagram.

FIG. 12 is a conceptual diagram illustrating a first embodiment of a beamforming operation state transition diagram.

Referring to FIG. 12, a beam may be acquired through a discovery of a beam (e.g., a panel) in a beam sweeping state. For example, a beam may be acquired through the discovery of beam in an initial access procedure, a handover (HO) procedure, a radio link failure (RLF) recovery procedure, and the like. A beam refinement procedure may be performed to maintain a link (e.g., maintain the data transmission/reception procedure) in a beam tracking state.

For the data transmission/reception procedure based on beamforming, a receiver may perform a beam measurement procedure, a beam identification procedure (e.g., a beam discovery procedure), a precoder selection procedure, a link adaptation procedure, a channel measurement procedure for a hybrid automatic repeat request (HARQ) retransmission, an interference measurement procedure, and the like. For the data transmission/reception procedure based on beamforming, a transmitter may perform beam selection/reselection/change/allocation/release operations based on measurement results obtained from the receiver. The operations performed at the transmitter may be performed in the beam sweeping state or the beam tracking state.

Meanwhile, a system model may be defined based on Equations 5 to 8 below according to antenna modeling and antenna arraying in a communication system using hybrid beamforming.

Complex output at far field: [Equation 5]

$$y(\varphi, \theta, t) = \sum_{m=1}^{N_{t_h}^a} \sum_{n=1}^{N_{t_v}^a} s_{m,n}(t) \cdot f_{m,n}^a \cdot f_{m,n}^d \cdot E_{m,n}(\varphi, \theta) = $$

$$P_E(\varphi, \theta) \cdot \tilde{F}^H \cdot S(t)$$

Where $$S(t) = \begin{bmatrix} s_{1,1}(t), s_{1,2}(t), \ldots, s_{1,N_{t_v}^a}(t), \ldots, s_{N_{t_h}^a,1}(t), \\ s_{N_{t_h}^a,2}(t), \ldots, s_{N_{t_h}^a,N_{t_v}^a}(t) \end{bmatrix}^T$$

$$E_{m,n}(\varphi, \theta) = P_E(\varphi, \theta) \cdot e^{j\frac{2\pi}{\lambda}\{(n-1)d_{t_v}\cos\theta + (m-1)d_{t_h}\sin\theta\sin\varphi\}}$$

Mean output power: [Equation 6]
$$P(\varphi, \theta) = E[|y(\varphi, \theta, t)|^2] = $$
$$P_E^2(\varphi, \theta) \cdot \tilde{F}^H \cdot E[S(t) \cdot S^H(t)] \cdot \tilde{F} = P_E^2(\varphi, \theta) \cdot \tilde{F}^H \cdot R \cdot \tilde{F}$$

In Equation 6, R may be an array correlation matrix, and R may be defined based on Equation 7 below.

$$R = E[S(t) \cdot S^H(t)] = \begin{bmatrix} R_{1,1} & R_{1,2} & \ldots & R_{1,N_{t_v}^a} & \ldots & R_{1,N_{t_v}^a N_{t_h}^a} \\ R_{2,1} & R_{2,2} & \ldots & R_{2,N_{t_v}^a} & \ldots & R_{2,N_{t_v}^a N_{t_h}^a} \\ \vdots & \vdots & R_{(i-1)N_{t_v}^a+j,(k-1)N_{t_v}^a+t} & \vdots & \ddots & \vdots \\ R_{N_{t_v}^a N_{t_h}^a,1} & R_{N_{t_v}^a N_{t_h}^a,2} & \ldots & & \ldots & R_{N_{t_v}^a N_{t_h}^a,N_{t_v}^a N_{t_h}^a} \end{bmatrix}$$ [Equation 7]

In Equation 7, $$R_{(i-1)N_{t_v}^a+j,(k-1)N_{t_v}^a+t}$$

may be a correlation between signals in the i-th column and the j-th row, and may be estimated as fast fading between spatially correlated antenna elements. Also, Equation 7 may be simplified as Equation 8 below.

$$R = \rho \cdot (U - I) + I = \rho \cdot U + (1 - \rho) \cdot I = \begin{bmatrix} 1 & \rho & \ldots & \rho \\ \rho & 1 & \ldots & \rho \\ \vdots & \vdots & \ddots & \vdots \\ \rho & \rho & \ldots & 1 \end{bmatrix}$$ [Equation 8]

where
U: all-1 matrix
I: unit matrix with 1 on the diagonal elements only

When hybrid beamforming is performed, a beam may be generated in an analog end and a digital end. The beam pattern may be set based on a combination of at least one of beam patterns of the analog end and the digital end. Here, the analog end may be a component located before an analog-to-digital converter (ADC) among components of the communication node (e.g., base station, terminal, S-device, etc.), and a beam of the analog end may be an analog signal. The digital end may be a component located after the ADC among the components of the communication node, and a beam of the digital end may be a digital signal.

Analog Beam Pattern

One beamformer included in the antenna module may correspond to one sector, and the beamformer may include a plurality of panels (e.g., array antennas, antenna elements) that performs beamforming.

Figure 13A:
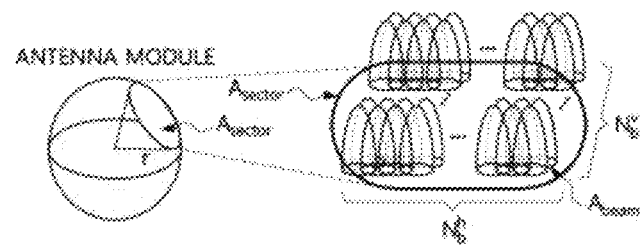
FIG. 13A is a conceptual diagram illustrating a first embodiment of a beam pattern in a service area served by one beamformer.
Figure 13B:
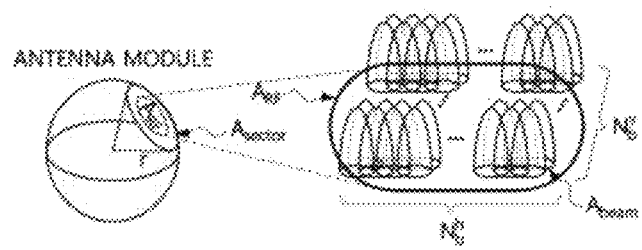
FIG. 13B is a conceptual diagram illustrating a second embodiment of a beam pattern in a service area served by one beamformer.

FIG. 13A is a conceptual diagram illustrating a first embodiment of a beam pattern in a service area served by one beamformer, and FIG. 13B is a conceptual diagram illustrating a second embodiment of a beam pattern in a service area served by one beamformer.

Referring to FIGS. 13A and 13B, $A_{sector}$ may indicate a beamformer or a service area served by the corresponding beamformer, and $A_{RF}$ may indicate a panel in the beamformer or a service area served by the corresponding panel. The $A_{sector}$ may be defined based on Equation 9 below.

$$A_{sector}(=\pi r^2 d_s^h d_s^h) \quad \text{[Equation 9]}$$

In Equation 9, $d_s^h$ may be horizontal covered degree of a sector, and $d_s^v$ may be vertical covered degree of a sector. The $A_{RF}$ may be defined based on Equation 10 below.

$$A_{RF}(=\pi r^2 d_c^v d_c^h) \quad \text{[Equation 10]}$$

In Equation 10, $d_c^h$ may be horizontal covered degree by a radio frequency (RF) chain, and $d_c^v$ may be vertical covered degree by a radio frequency (RF) chain. The $A_{beam}$ may be defined based on Equation 11 below.

$$A_{beam}(=\pi r^2 \text{HPBW}(N_{t_h}^a)\text{HPBW}(N_{t_v}^a)) \quad \text{[Equation 11]}$$

$\text{HPBW}(N_{t_h}^a)$ may be a HPBW generated by the antenna elements disposed in the horizontal axis, and $\text{HPBW}(N_{t_v}^a)$ may be a HPBW generated by the antenna elements disposed in the vertical axis.

If Equation 12 below is satisfied, the $A_{sector}$ may be defined based on Equation 13 below, the $A_{RF}$ may be defined based on Equation 14 below, and the $A_{beam}$ may be defined based on Equation 15 below.

$$d_s^h, d_s^v, d_c^h, d_c^v \leq \frac{\pi}{2} \ \& \text{HPBW}(N_{t_h}^a), \text{HPBW}(N_{t_h}^a) \leq \frac{\pi}{2} \quad \text{[Equation 12]}$$

$$A_{sector}(=\pi r^2 d_s^h d_s^h \sin(d_s^h)\sin(d_s^v)) \quad \text{[Equation 13]}$$

$$A_{RF}(=\pi r^2 \sin(d_c^h)\sin(d_c^v)) \quad \text{[Equation 14]}$$

$$A_{beam}(=\pi r^2 \sin(\text{HPBW}(N_{t_h}^a))\sin(\text{HPBW}(N_{t_v}^a))) \quad \text{[Equation 15]}$$

For the beam patterns, the number of beams ($N_b^h$, $N_b^v$) may be determined based on Equation 16 below.

$$N_b^h = \left\lceil \frac{d_c^h}{\alpha_h \times \text{HPBW}(N_{t_h}^a)} \right\rceil,$$

$$N_b^v = \left\lceil \frac{d_c^v}{\alpha_v \times \text{HPVW}(N_{t_v}^a)} \right\rceil \quad \text{[Equation 16]}$$

$[x]=\min\{n \in \mathbb{Z} \mid n \geq x\}$, $\mathbb{Z}$ is the set of integers $\text{HPBW}(N_t^a)$: HPBW radiated (beamformed) by $N_t^a$ antenna element $N_b^h$ may be the number of beams in the horizontal axis, and $N_b^v$ may be the number of beams in the vertical axis. $d_c^h$ may be the maximum steering horizontal axis angle of the antenna element (or panel, array antenna), and $d_c^v$ may be the maximum steering vertical axis angle of the antenna element (or panel, array antenna). Boresight of the panel may be set to a coordinate corresponding to $(d_s^h/2, d_s^v/2)$. $d_c^h$ may be defined based on Equation 17 below, and $d_c^v$ may be defined based on Equation 18 below.

$$d_c^h \left( = \left\lceil \frac{d_s^h}{\beta_c^h \times N_{t_h}^c} \right\rceil + \delta_c^h \right) \quad \text{[Equation 17]}$$

$$d_c^v \left( = \left\lceil \frac{d_s^v}{\beta_c^v \times N_{t_v}^c} \right\rceil + \delta_c^v \right) \quad \text{[Equation 18]}$$

If Equation 19 below is satisfied, $N_b^h$ may be defined based on Equation 20 below, and $N_b^v$ may be defined based on the Equation 21 below.

$$d_c^h \leq \frac{\pi}{2} \ \& d_c^v \leq \frac{\pi}{2} \quad \text{[Equation 19]}$$

$$N_b^h = \left\lceil \frac{d_c^h}{\alpha_h \times \text{HPBW}(N_{t_h}^a)} \right\rceil \text{ or } \left\lceil \frac{\sin(d_c^h)}{\alpha_h \times \sin\{\text{HPBW}(N_{t_h}^a)\}} \right\rceil \quad \text{[Equation 20]}$$

$$N_b^v = \left\lceil \frac{d_c^v}{\alpha_v \times \text{HPBW}(N_{t_v}^a)} \right\rceil \text{ or } \left\lceil \frac{\sin(d_c^v)}{\alpha_v \times \sin\{\text{HPBW}(N_{t_v}^a)\}} \right\rceil \quad \text{[Equation 21]}$$

Also, $d_s^h$ may be defined based on Equation 22 below, and $d_s^v$ may be defined based on Equation 23 below.

$$d_s^h \left( = \left\lceil \frac{2\pi}{\beta_s^h \times N_s^h} \right\rceil + \delta_s^h \right) \quad \text{[Equation 22]}$$

$$d_s^v \left( = \left\lceil \frac{\pi}{\beta_s^v \times N_s^v} \right\rceil + \delta_s^v \right) \quad \text{[Equation 23]}$$

$N_s^h$ may be the number of sectors in the horizontal axis, and $N_s^v$ may be the number of sectors in the vertical axis. Thus, ($N_s^h \times N_s^v$) sectors may exist. $N_{t_h}^c$ may be the number of panels in the horizontal axis, and $N_{t_v}^c$ may be the number of panels in the vertical axis. Thus, ($N_{t_h}^c \times N_{t_v}^c$) panels may exist in one beamformer. Here, $N_s^h$, $N_s^v$, $N_{t_h}^c$, and $N_{t_v}^c$ each may be an integer greater than or equal to 1. Also. Equation 24 below may be defined.

$$\beta_s^h, \beta_s^v, \beta_c^h, \beta_c^v > 0 \ \& \ 0 \leq \delta_s^h, \delta_c^h \leq 2\pi \ \& \ 0 \leq \delta_s^v, \delta_c^v \leq \pi \quad \text{[Equation 24]}$$

Boresight coordinate (e.g., steering angle) of the beam ($i_h$, $i_v$) of the panel ($j_h$, $j_v$) arranged at equal intervals in the service area according to the beam pattern and the number of beams may be defined based on Equation 25 below. In Equation 25, 'Alt1' may be a first embodiment of a beam pattern in the service area served by one beamformer shown in FIG. 13A, and 'Alt2' may be a second embodiment of a beam pattern in the service area served by one beamformer shown in FIG. 13B.

$$\left( \frac{d_c^h}{N_{t_h}^c \times N_b^h} \times i_h \times j_h - \frac{d_c^h}{\rho_h \times N_{t_h}^c \times N_b^h}, \right. \quad \text{[Equation 25]}$$

-continued $$\frac{d_c^v}{N_{t_v}^c \times N_b^v} \times i_v \times j_v - \frac{d_c^v}{\rho_v \times N_{t_v}^c \times N_b^v}\bigg)$$

$d_c^h$, $d_c^v$: area supported by one panel (horizontal/vertical angles)

$N_{t_h}^c$ (>0), $N_{t_v}^c$ (>0): the number of panels in horizontal/vertical axes $N_b^h$ (>0), $N_b^v$ (>0): the number of beams in horizontal/vertical axes, which can be generated by one panel $i_h = 1, \ldots, N_b^h$
$i_v = 1, \ldots, N_b^v$ $$j_h = \begin{cases} 1, & Alt1 \\ 1, \ldots, N_{t_h}^c, & Alt2 \end{cases}$$

$$j_v = \begin{cases} 1, & Alt1 \\ 1, \ldots, N_{t_v}^c, & Alt2 \end{cases}$$

$\rho_h, \rho_v \neq 0$

Meanwhile, in FIG. 13A, when the sector is configured to 60 degrees×60 degrees, the beam pattern and boresight may be defined based on Table 2 below. In Table 2, '1 RF' may indicate one panel.

TABLE 2

| Total number of antennas | $N_{t,h}^a \times N_{t,v}^a$ (in 1 RF) | Number of RF, $N_t^c$ | Number of beams, $N_b$ (in 1 RF) | HPBW | Boresight of beam (steering angle) (in 1 RF) |
|---|---|---|---|---|---|
| 1024 | 4 × 4 | 64(=8 × 8) | ≈16(=4 × 4) | ≈16.25° | {7.5, 22.5, 37.5, 52.5} |
| 1024 | 8 × 8 | 16(=4 × 4) | ≈16(=4 × 4) | ≈8.125° | {7.5, 22.5, 37.5, 52.5} |
| 1024 | 8 × 8 | 16(=4 × 4) | ≈25(=5 × 5) | ≈8.125° | {6, 18, 30, 42, 54} |
| 1024 | 8 × 8 | 16(=4 × 4) | ≈36(=6 × 6) | ≈8.125° | {5, 15, 25, 35, 45, 55} |
| 1024 | 16 × 16 | 4(=2 × 2) | ≈225(=15 × 15) | ≈4.06° | {2, 6, 10, . . . 58} |
| 256 | 4 × 4 | 16(=4 × 4) | ≈16(=4 × 4) | ≈16.25° | {7.5, 22.5, 37.5, 52.5} |
| 256 | 8 × 8 | 4(=2 × 2) | ≈16(=4 × 4) | ≈8.125° | {7.5, 22.5, 37.5, 52.5} |
| 256 | 8 × 8 | 4(=2 × 2) | ≈25(=5 × 5) | ≈8.125° | {6, 18, 30, 42, 54} |
| 256 | 8 × 8 | 4(=2 × 2) | ≈36(=6 × 6) | ≈8.125° | {5, 15, 25, 35, 45, 55} |
| 256 | 16 × 16 | 1 | ≈225(=15*15) | ≈4.06° | {2, 6, 10, . . . 54, 58} |

In FIG. 13A, when the sector is configured to 90 degrees×90 degrees, the beam pattern and boresight may be defined based on Table 3 below. In Table 3, '1 RF' may indicate one panel.

TABLE 3

| Total number of antennas | $N_{t,h}^a \times N_{t,v}^a$ (in 1 RF) | Number of RF, $N_t^c$ | Number of beams, $N_b$ (in 1 RF) | HPBW | Boresight of beam (steering angle) (in 1 RF) |
|---|---|---|---|---|---|
| 1024 | 4 × 4 | 64(=8 × 8) | ≈36(=6 × 6) | ≈16.25° | {7.5, 22.5, 37.5, 52.5, 67.5, 82.5} |
| 1024 | 8 × 8 | 1.6(=4 × 4) | ≈16(=4 × 4) | ≈8.125° | {11.25, 33.75, 56.25, 78.75} |
| 1024 | 8 × 8 | 16(=4 × 4) | ≈25(=5 × 5) | ≈8.125° | {9, 27, 45, 63, 81} |
| 1024 | 8 × 8 | 16(=4 × 4) | ≈36(=6 × 6) | ≈8.125° | {7.5, 22.5, 37.5, 52.5, 67.5, 82.5} |
| 1024 | 16 × 16 | 4(=2 × 2) | ≈529(=23 × 23) | ≈4.06° | {1.95, 5.86, . . . , 84.13, 88.04} |
| 256 | 4 × 4 | 16(=4 × 4) | ≈36(=6 × 6) | ≈16.25° | {7.5, 22.5, 37.5, 52.5, 67.5, 82.5} |
| 256 | 8 × 8 | 4(=2 × 2) | ≈16(=4 × 4) | ≈8.125° | {11.25, 33.75, 56.25, 78.75} |
| 256 | 8 × 8 | 4(=2 × 2) | ≈25(=5 × 5) | ≈8.125° | {9, 27, 45, 63, 81} |
| 256 | 8 × 8 | 4(=2 × 2) | ≈36(=6 × 6) | ≈8.125° | {7.5, 22.5, 37.5, 52.5, 67.5, 82.5} |
| 256 | 16 × 16 | 1 | ≈529(=23 × 23) | ≈4.06° | {1.95, 5.86, . . . , 84.13, 88.04} |

In FIG. 13B, when the sector is configured to 60 degrees×60 degrees, the beam pattern and boresight may be defined based on Table 4 below. In Table 4, '1 RF' may indicate one panel.

TABLE 4

| Total number of antennas | $N_{t,h}^a \times N_{t,v}^a$ (in 1 RF) | Number of RF, $N_t^c$ | Number of beams, $N_b$ (in 1 RF) | HPBW | Boresight of each RF | Boresight of beam (steering angle) (in 1 RF) |
|---|---|---|---|---|---|---|
| 1024 | 4 × 4 | 64(=8 × 8) | ≈1 | ≈16.25° | 3.75, 11.25, . . . , 48.75, 56.25 | N/A |
| 1024 | 8 × 8 | 16(=4 × 4) | ≈4(=2 × 2) | ≈8.125° | 7.5, 22.5, 37.5, 52.5 | {3.75, 11.25} {18.75, 26.25} {33.75, 41.25} {48.75, 56.25} |
| 1024 | 16 × 16 | 4(=2 × 2) | ≈64(=8 × 8) | ≈4.06° | 15, 45 | {1.875, 5.625, 9.375, . . . , |

TABLE 4-continued

| Total number of antennas | $N_{t,h}^a \times N_{t,v}^a$ (in 1 RF) | Number of RF, $N_t^c$ | Number of beams, $N_b$ (in 1 RF) | HPBW | Boresight of each RF | Boresight of beam (steering angle) (in 1 RF) |
|---|---|---|---|---|---|---|
| | | | | | | 28.125} {31.875, 35.625, ..., 58.125} |
| 256 | 4 × 4 | 16(=4 × 4) | ≈1 | ≈16.25° | 7.5, 22.5, 37.5, 52.5 | N/A |
| 256 | 8 × 8 | 4(=2 × 2) | ≈16(=4 × 4) | ≈8.125° | 15, 45 | {3.75, 11.25, 18.75, 26.25} {33.75, 41.25, 48.75, 56.25} |
| 256 | 16 × 16 | 1 | ≈225(=15*15) | ≈4.06° | 30 | {2, 6, 10, ..., 54, 58} |
| 1024 | 4 × 4 | 64(=8 × 8) | ≈1 | ≈16.25° | 3.75, 11.25, ..., 48.75, 56.25 | N/A |
| 1024 | 8 × 8 | 16(=4 × 4) | ≈4(=2 × 2) | ≈8.125° | 7.5, 22.5, 37.5, 52.5 | {3.75, 11.25} {18.75, 26.25} {33.75, 41.25} {48.75, 56.25} |
| 1024 | 16 × 16 | 4(=2 × 2) | ≈64(=8 × 8) | ≈4.06° | 15, 45 | {1.875, 5.625, 9.375, ..., 28.125} {31.875, 35.625, ..., 58.125} |
| 256 | 4 × 4 | 16(=4 × 4) | ≈1 | ≈16.25° | 7.5, 22.5, 37.5, 52.5 | N/A |
| 256 | 8 × 8 | 4(=2 × 2) | ≈16(=4 × 4) | ≈8.125° | 15, 45 | {3.75, 11.25, 18.75, 26.25} {33.75, 41.25, 48.75, 56.25} |

In FIG. 13B, when the sector is configured to 90 degrees× 90 degrees, the beam pattern and boresight may be defined based on Table 5 below. In Table 5, '1 RF' may indicate one panel.

TABLE 5

| Total number of antennas | $N_{t,h}^a \times N_{t,v}^a$ (in 1 RF) | Number of RF, $N_t^c$ | Number of beams, $N_b$ (in 1 RF) | HPBW | Boresight of each RF | Boresight of beam (steering angle) (in 1 RF) |
|---|---|---|---|---|---|---|
| 1024 | 4 × 4 | 64(=8 × 8) | ≈1 | ≈16.25° | 5.625, 16.875, ... 73.125, 84.375 | N/A |
| 1024 | 8 × 8 | 16(=4 × 4) | ≈4(=2 × 2) | ≈8.125° | 11.25, 33.75, 56.25, 78.75 | {5.625, 16.875} {28.125, 39.375} {50.625, 61.875} {73.125, 84.375} |
| 1024 | 16 × 16 | 4(=2 × 2) | ≈100(=10 × 10) | ≈4.06° | 22.5, 67.5 | {2.25, 6.75, ..., 42.75} {47.25, 51.75, ..., 87.75} |
| 256 | 4 × 4 | 16(=4 × 4) | ≈4(=2 × 2) | ≈16.25° | 11.25, 33.75, 56.25, 78.75 | {5.625, 16.875, 28} {125, 39.375} {50.625, 61.875} {73.125, 84.375} |
| 256 | 8 × 8 | 4(=2 × 2) | ≈16(=4 × 4) | ≈8.125° | 22.5, 67.5 | {5.625, 16.875, 28.125, 39.375} {50.625, 61.875, 73.125, 84.375} |
| 256 | 8 × 8 | 4(=2 × 2) | ≈25(=5 × 5) | ≈8.125° | 22.5, 67.5 | {4.5, 13.5, 22.5, 31.5, 40.5} {49.5, 58.5, 67.5, 76.5, 85.5} |

TABLE 5-continued

| Total number of antennas | $N_{t,h}^a \times N_{t,v}^a$ (in 1 RF) | Number of RF, $N_t^c$ | Number of beams, $N_b$ (in 1 RF) | HPBW | Boresight of each RF | Boresight of beam (steering angle) (in 1 RF) |
|---|---|---|---|---|---|---|
| 256 | 8 × 8 | 4(=2 × 2) | ≈36(=6 × 6) | ≈8.125° | 22.5, 67.5 | {3.75, 11.25, ..., 41.25} |

Meanwhile, in the embodiments shown in FIGS. 13A and 13B, the antenna gains and the beamwidths may be as follows.

Figure 14A:
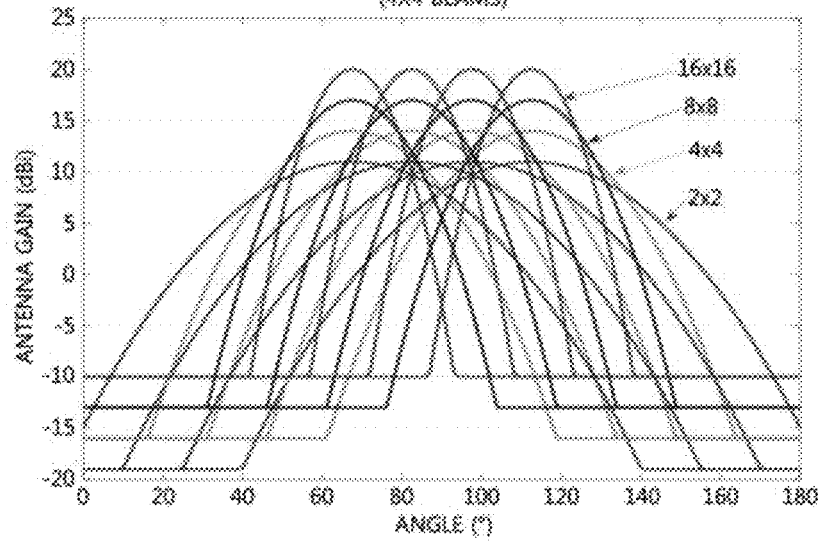
FIG. 14A is a graph illustrating a first embodiment of antenna gains and beam patterns according to the embodiment shown in FIG. 13A.
Figure 14B:
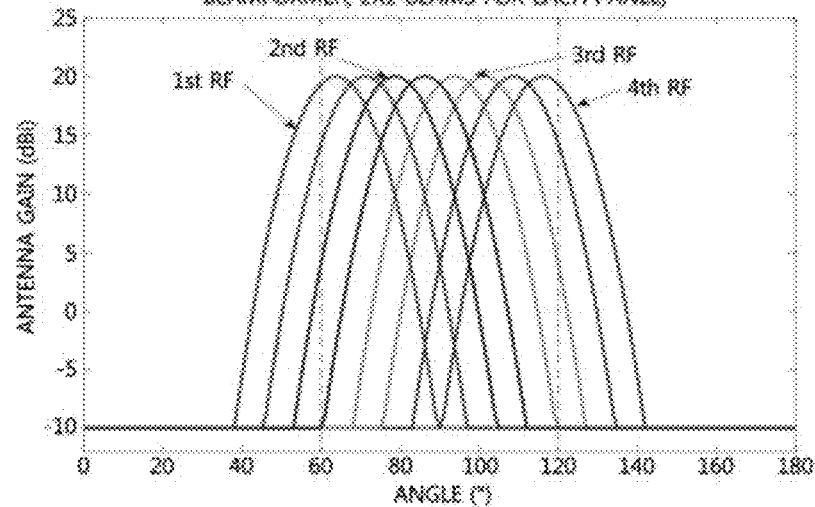
FIG. 14B is a graph illustrating a first embodiment of antenna gains and beam patterns according to the embodiment shown in FIG. 13B.

FIG. 14A is a graph illustrating a first embodiment of antenna gains and beam patterns according to the embodiment shown in FIG. 13A, and FIG. 14B is a graph illustrating a first embodiment of antenna gains and beam patterns according to the embodiment shown in FIG. 13B.

Referring to FIGS. 14A and 14B, each of the '2×2', '4×4', '8×8', and '16×16' may indicate the number of antenna elements, and the RF may indicate the corresponding panel. In FIG. 14A, communication services may be provided throughout the entire sector by one beamformer. In FIG. 14B, communication services may be provided in a sector (e.g., a certain area within a sector) by one panel. In this case, areas (e.g., sub-sectors) within a sector corresponding to each of the panels belonging to one beamformer may be set, and each panel may provide communication services in the corresponding sub-sector. According to the embodiment of FIG. 14A, a coverage hole in which no communication services are provided may be generated, and a beam pattern may be additionally generated to solve this problem. Alternatively, a beam may be generated at the digital end to resolve the coverage hole.

Analog Beam Codebook $a_t(\varphi_i, \theta_i)$ may be a beamforming vector mapped to $(\varphi_i, \theta_i)$ according to quantized beam steering angles, and indicate an analog beam shared between the transmitter and the receiver. An analog codebook $\mathcal{A}_t$ may be defined as follows.

$$|\mathcal{A}_t| = |\mathcal{A}_{t_h} \otimes \mathcal{A}_{t_v}| = N_b = N_b^h N_b^v \qquad \text{[Equation 26]}$$

Maximum supportable steering angle with respect to the boresight of transmitter: $[-\theta_{max}, \theta_{max}]$ & $[-\varphi_{max}, \varphi_{max}]$
where $$0 < \theta_{max}, \varphi_{max} \leq \frac{\pi}{2}$$

$\mathcal{A}_t$ may be quantized according to the angle of the service area of the beam pattern (e.g., beamwidth, boresight) based on Equation 27 or 28 below. In Equations 27 and 28, each of $\varphi_{max}$ and $\theta_{max}$ may correspond to $d_c^h$ and $d_c^v$.

$$\mathcal{A}_{t_h} = \left\{ \varphi_i \mid \varphi_i = \frac{2i - 1 - 2^{N_b^h}}{2^{N_b^h}} \varphi_{max}, i = 1, \ldots, 2^{N_b^h} \right\} \qquad \text{[Equation 27]}$$

$$\mathcal{A}_{t_v} = \left\{ \theta_i \mid \theta_i = \frac{2i - 1 - 2^{N_b^v}}{2^{N_b^v}} \theta_{max}, i = 1, \ldots, 2^{N_b^v} \right\}$$

$$\mathcal{A}_{t_h} = \left\{ \varphi_i \mid \varphi_i = \sin^{-1}\left(\frac{2i - 1 - 2^{N_b^h}}{2^{N_b^h}} \sin\varphi_{max}\right), i = 1, \ldots, 2^{N_b^h} \right\} \qquad \text{[Equation 28]}$$

$$\mathcal{A}_{t_v} = \left\{ \theta_i \mid \theta_i = \sin^{-1}\left(\frac{2i - 1 - 2^{N_b^v}}{2^{N_b^v}} \sin\theta_{max}\right), i = 1, \ldots, 2^{N_b^v} \right\}$$

Digital Beam Pattern

The beam generated through the phase shift at the analog end may be operated on the basis of the beamwidth, service area, and the like. However, if a coverage hole occurs between analog beams, fine beamforming may be required. In order to solve this problem, digital beamforming (e.g., digital beamforming (DBF), baseband precoding (BBP)) may be applied.

Figure 15:
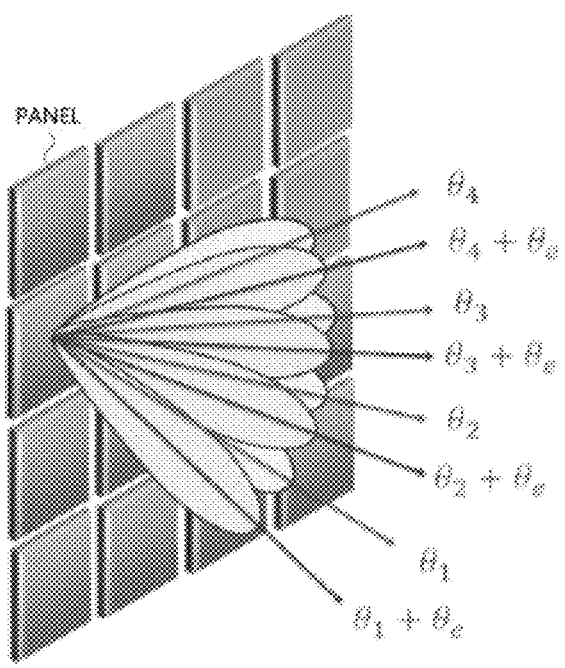
FIG. 15 is a conceptual diagram illustrating a first embodiment of a beam pattern when hybrid beamforming is performed.

FIG. 15 is a conceptual diagram illustrating a first embodiment of a beam pattern when hybrid beamforming is performed.

Referring to FIG. 15, beam patterns for four beams to which an electrical tilting (e.g., $\theta_e$) is applied may be added to beam patterns for four beams having boresights ($\theta_1$, $\theta_2$, $\theta_3$, and $\theta_4$). In this case, beam patterns for eight beams having boresights ($\theta_1$, $\theta_1+\theta_e$, $\theta_2$, $\theta_2+\theta_e$, $\theta_3$, $\theta_3+\theta_e$, $\theta_4$, and $\theta_4+\theta_e$). The performance of the beam patterns (e.g., the digital beam pattern) generated based on the electrical tilting may be identical to that of the analog beam patterns having boresights ($\theta_1$, $\theta_1+\theta_e$, $\theta_2$, $\theta_2+\theta_e$, $\theta_3$, $\theta_3+\theta_e$, $\theta_4$, and $\theta_4+\theta_e$). The beam patterns may be generated based on Equation 29 below.

$$\text{[Equation 29]}$$

$$F = [F_A^a \ F_E^e] \text{ (Khatri-Rao product)}$$

$$= \left[ \begin{array}{c} \left[F_{1,1}^a, F_{1,2}^a, \ldots, F_{1,N_{t_v}^c}^a, F_{2,1}^a, \ldots, F_{N_b^c,1}^a, \ldots, F_{N_{t_h}^c, N_{t_v}^c}^a\right]^* \\ \left[F_{1,1}^e, F_{1,2}^e, \ldots, F_{1,N_{t_v}^c}^e, F_{2,1}^e, \ldots, F_{N_b^c,1}^e, \ldots, F_{N_{t_h}^c, N_{t_v}^c}^e\right] \end{array} \right]^T$$

$$= \left[ \begin{array}{c} F_{1,1}^a \otimes F_{1,1}^e | F_{1,2}^a \otimes F_{1,2}^e | \ldots | F_{1,N_{t_v}^c}^a \otimes F_{1,N_{t_v}^c}^e | \ldots \\ | F_{m,n}^a \otimes F_{m,n}^e | \ldots | F_{N_{t_h}^c, N_{t_v}^c}^a \otimes F_{N_{t_h}^c, N_{t_v}^c}^e \end{array} \right]^T$$

$$F_{m,n}^a \otimes F_{m,n}^e = \left[ \begin{array}{c} f_{1,1}^a, \ldots, f_{1,N_{t_v}^a}^a, f_{2,1}^a, \ldots, f_{2,N_{t_v}^a}^a, \ldots, \\ f_{N_{t_h}^a,1}^a, \ldots, f_{N_{t_h}^a, N_{t_v}^a}^a \end{array} \right] \otimes [f_{m,n}^c]$$

$$= \left[ \begin{array}{c} f_{1,1}^a f_{m,n}^e, \ldots, f_{1,N_{t_v}^a}^a f_{m,n}^e, f_{2,1}^a f_{m,n}^e, \ldots, \\ f_{2,N_{t_v}^a}^a f_{m,n}^e, \ldots, f_{N_{t_h}^a,1}^a f_{m,n}^e, \ldots, f_{N_{t_h}^a, N_{t_v}^a}^a f_{m,n}^e \end{array} \right]$$

An array factor for the electrical tilting may be configured based on Equation 30 below. Here, $\varphi_i$ and $\theta_i$ may indicate boresight of the beam.

$$f_{m,n}(\varphi_i, \theta_i) = f_{m,n}^a(\varphi_i^a, \theta_i^a) f_{m,n}^e(\varphi_i^e, \theta_i^e) \quad \text{[Equation 30]}$$

$$\varphi_i = \varphi_i^a + \varphi_i^e$$

$$\theta_i = \theta_i^a + \theta_i^e$$

$$m = 1, 2, \ldots, N_{t_h}^a$$

$$n = 1, 2, \ldots, N_{t_v}^a$$

$$f_{m,n}^a(\varphi_i^a, \theta_i^a) = e^{j\frac{2\pi}{\lambda}\{(n-1)d_{t_v}\cos\theta_i^a - (m-1)d_{t_h}\sin\theta_i^a \sin\varphi_i^a\}}$$

$$f_{m,n}^e(\varphi_i^e, \theta_i^e) = \frac{1}{\sqrt{N_{t_h}^a N_{t_v}^a}} e^{j\frac{2\pi}{\lambda}\{(n-1)d_{t_v}\sin\theta_i^e - (m-1)d_{t_h}\cos\theta_i^e \sin\varphi_i^e\}}$$

The interval between panels in one beamformer may be defined based on Equation 31 below.

$$d_g^H = N_{t_h}^a \times d_{t_h}$$

$$d_g^V = N_{t_v}^a \times d_{t_v} \quad \text{[Equation 31]}$$

Figure 16:
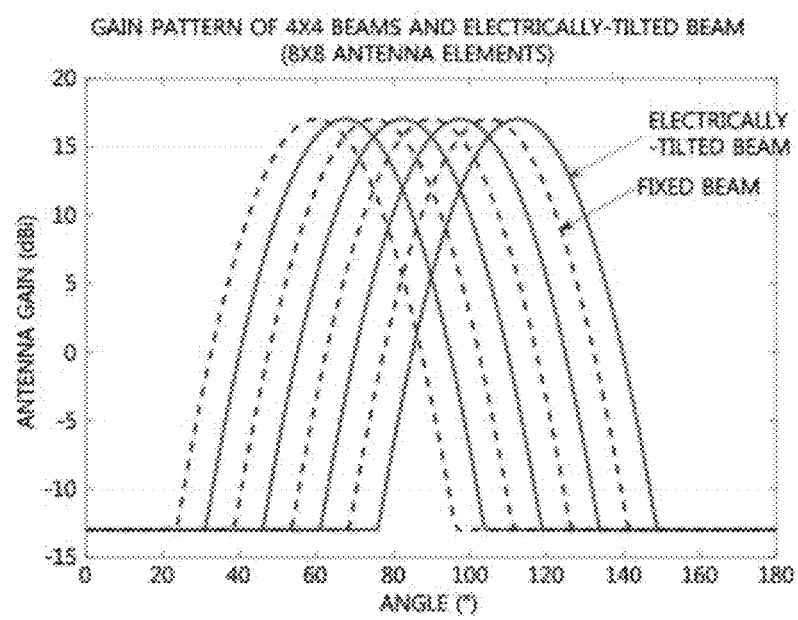
FIG. 16 is a graph illustrating a first embodiment of antenna gains and beam patterns when hybrid beamforming is performed.

FIG. 16 is a graph illustrating a first embodiment of antenna gains and beam patterns when hybrid beamforming is performed.

Referring to FIG. 16, the electrical tilting may be applied to 4×4 fixed beam patterns (e.g., 4×4 analog beam patterns) at the digital end so as to generate 8×8 beam patterns (e.g., 4×4 fixed beam patterns+4×4 electrically tilted beam patterns can be generated. Each of the beam patterns and antenna gains of the embodiment shown in FIG. 16 may be the same as each of the beam patterns and antenna gains of the embodiment shown in FIG. 14B.

Digital Beam Codebook $a_t(\varphi_i, \theta_i)$ may be a beamforming vector mapped to $(\varphi_i, \theta_i)$ according to quantized beam steering angles, and indicate a digital beam shared between the transmitter and the receiver. A digital codebook $\mathcal{A}_t$ may be defined as follows.

$$|\mathcal{A}_t| = |\mathcal{A}_{t_h} \otimes \mathcal{A}_{t_v}| = N_b = N_b^h N_b^v \quad \text{[Equation 32]}$$

Maximum supportable steering angle with respect to the boresight of transmitter. $[-\theta_{max}, \theta_{max}]$ & $[-\varphi_{max}, \varphi_{max}]$ where $$0 < \theta_{max}, \varphi_{max} \leq \frac{\pi}{2}$$

$\mathcal{A}_t$ may be quantized according to the angle of the service area of the beam pattern (e.g., beamwidth, boresight) based on Equation 33 below.

$$\mathcal{A}_{t_h} = \quad \text{[Equation 33]}$$

$$\{\varphi_{i,j} | \varphi_{i,j} = \varphi_i^a + \varphi_j^e, i = 1, \ldots, 2^{N_b^h}, j = 1, \ldots, 2^{N_{e-b}^h}\} =$$

$$\{\varphi_{1,1}, \ldots, \varphi_{1,n}, \ldots, \varphi_{m,1}, \ldots, \varphi_{m,n}\},$$

$$\mathcal{A}_{t_v} = \{\theta_{i,j} | \theta_{i,j} = \theta_i^a + \theta_j^e, i = 1, \ldots, 2^{N_b^v}, j = 1, \ldots,$$

$$2^{N_{e-b}^v}\} = \{\theta_{1,1}, \ldots, \theta_{1,n}, \ldots, \theta_{m,1}, \ldots, \theta_{m,n}\},$$

Panel-Based Beam Combining

An independent RF (e.g., beam) may be generated for each panel, and the same number of beams as the maximum number of panels in the data transmission/reception procedure may be used.

Figure 17A:
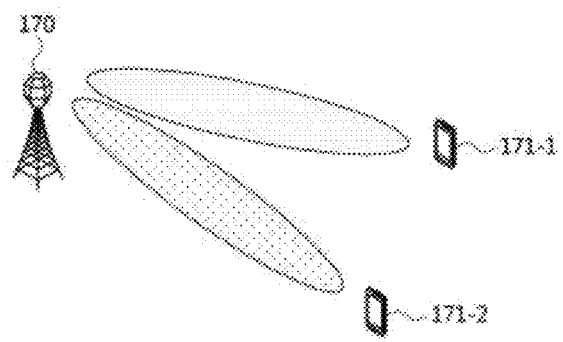
FIG. 17A is a conceptual diagram illustrating a first embodiment of a panel-based beam transmission method.
Figure 17B:
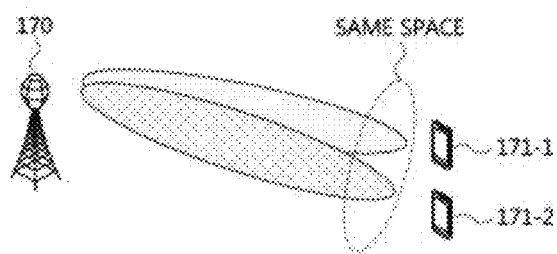
FIG. 17B is a conceptual diagram illustrating a second embodiment of a panel-based beam transmission method.
Figure 17C:
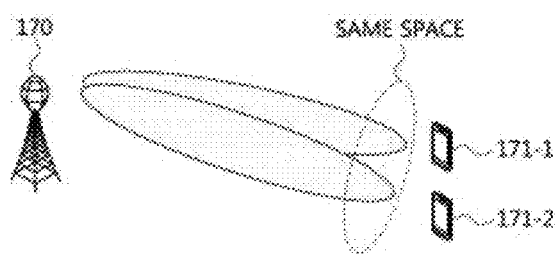
FIG. 17C is a conceptual diagram illustrating a third embodiment of a panel-based beam transmission method.
Figure 17D:
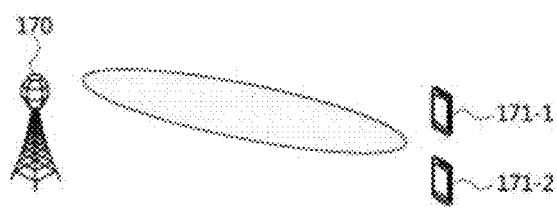
FIG. 17D is a conceptual diagram illustrating a fourth embodiment of a panel-based beam transmission method.

FIG. 17A is a conceptual diagram illustrating a first embodiment of a panel-based beam transmission method, FIG. 17B is a conceptual diagram illustrating a second embodiment of a panel-based beam transmission method, FIG. 17C is a conceptual diagram illustrating a third embodiment of a panel-based beam transmission method, and FIG. 17D is a conceptual diagram illustrating a fourth embodiment of a panel-based beam transmission method.

In FIG. 17A, a base station 170 may provide communication services to terminals 171-1 and 171-2 by transmitting different beams (e.g., beams having different beam indices) through a plurality of panels, and the beams may be transmitted through different spaces. In a case that the terminals 171-1 and 171-2 are located adjacent to each other, in FIGS. 17B to 17D, the base station 170 may provide communication services to the terminals 171-1 and 171-2 by transmitting the beams through the same space. Here, interference may occur when the time-frequency resources of the beams are the same.

In FIG. 17B, the base station 170 may provide communication services to the terminals 171-1 and 171-2 by transmitting different beams (e.g., beams having different beam indices) through a plurality of panels, and the beams may be transmitted through the same space. In FIG. 17C, the base station 170 may provide communication services to the terminals 171-1 and 171-2 by transmitting different beams (e.g., beams having different beam indices) through one panel, and the beams may be transmitted through the same space. Here, the transmit power of each of the two beams may be ½ of the total transmit power of the base station 170. In order to solve this problem, the base station 170 in FIG. 17D may provide communication services to the terminals 171-1 and 171-2 by transmitting one beam through one panel and the same space. Here, two or more beams may be combined. Also, a virtual beam combining scheme (e.g., a panel virtualization scheme) may be used. When the virtual beam combining scheme is used, one virtual panel may be configured based on a plurality of panels instead of one panel, and one beam may be generated through the one virtual panel.

FIG. 18A is a conceptual diagram illustrating a first embodiment of a beam transmission method through a relay, and FIG. 18B is a conceptual diagram illustrating a second embodiment of a beam transmission method through a relay.

Interference may occur between beams of base stations 180-1 and 180-2 in FIG. 18A, and communication services may be provided to a terminal 182 through a relay 181 in this case. Therefore, the interference between the beams may be reduced. When there is a little change in a channel or when the amount of data to be transmitted increases, communications may be performed based on the beam combining scheme. For example, in FIG. 18B, a base station 180 may provide communication services using a combined beam.

Figure 19:
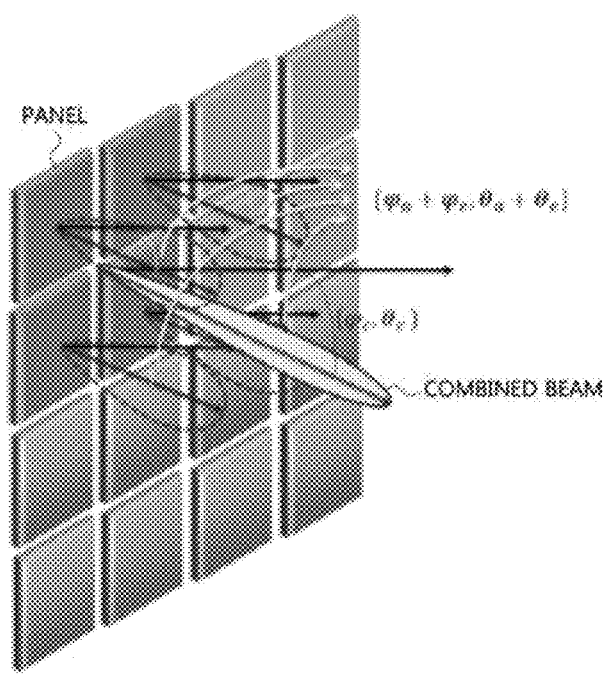
FIG. 19 is a conceptual diagram illustrating a first embodiment of a beam pattern to which a virtual beam combining scheme is applied.
Figure 20:
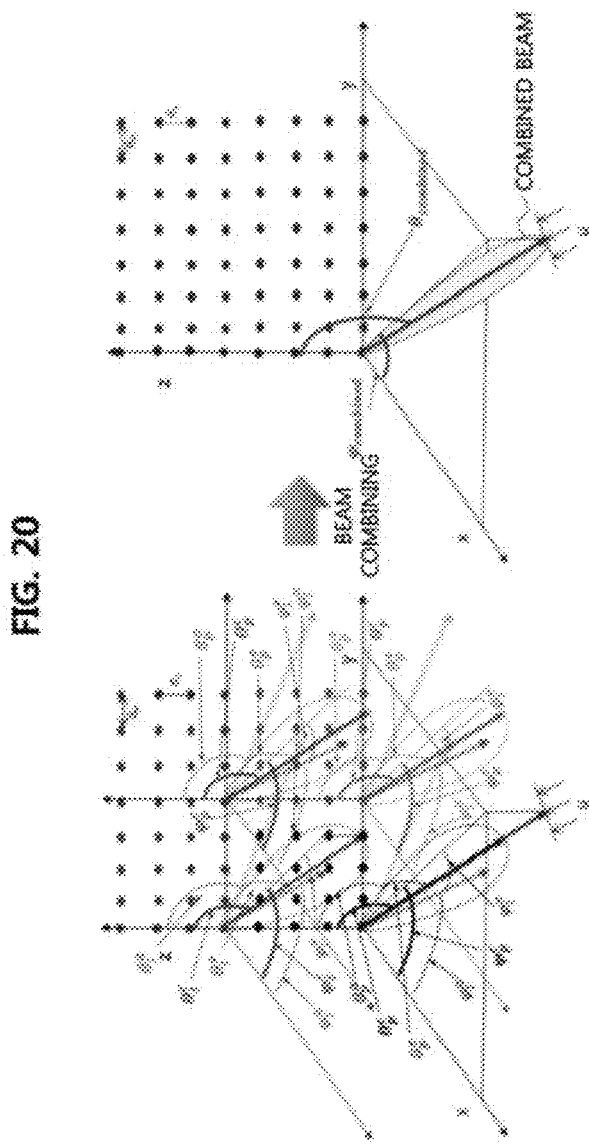
FIG. 20 is a conceptual diagram illustrating a first embodiment of a beam combined through a virtual beam combining scheme.

FIG. 19 is a conceptual diagram illustrating a first embodiment of a beam pattern to which a virtual beam combining scheme is applied, and FIG. 20 is a conceptual diagram illustrating a first embodiment of a beam combined through a virtual beam combining scheme.

Referring to FIGS. 19 and 20, one virtual panel may be generated based on a plurality of panels, and boresight of the beam generated by the virtual panel may be $\{\varphi_c, \theta_c\}$. Boresight of the beam generated by each of the panels based on ABF/DBF may be $\{\varphi_c (=\varphi_a + \varphi_e), \theta_c (=\theta_a + \theta_e)\}$.

In an ABF step, an analog beam may be generated by antenna arraying and phase shift of each of the panels. Also, in a DBF step, a precoding may be performed to generate one combined beam in the panels that perform beam combining. The beam combining scheme in the panels may be classified as follows.

Beam combining scheme 1: combine beams only at the ABF step without panel virtualization Beam combining scheme 2: combine beams only at the ABF step with panel virtualization Beam combining scheme 3: combine beams in the ABF and DBF (e.g., electrical tilting) steps without panel virtualization Beam combining scheme 4: combine beams in the ABF and DBF steps with panel virtualization Beam combining scheme 5: combine beams in the ABF or DBF step with panel virtualization The array factor according to the beam combining may be defined based on Equation 34 below.

$$\tilde{F} = [F_P^D \otimes F^{BF}]^T$$
$$= \begin{bmatrix} [f_{1,1}^d, \ldots, f_{1,p_v}^d, f_{2,1}^d, \ldots, f_{2,p_v}^d, \ldots, f_{p_h,1}^d, \ldots, f_{p_h,p_v}^d] \otimes \\ [f_{1,1}^{BF}, \ldots, f_{1,N_{t_v}^a}^{BF}, f_{2,1}^{BF}, \ldots, f_{2,N_{t_v}^a}^{BF}, \ldots, f_{N_{t_h}^a,1}^{BF}, \ldots, f_{N_{t_h}^a,N_{t_v}^a}^{BF}] \end{bmatrix}^T$$

[Equation 34]

In Equation 34, the array factor $F_P^D$ according to the panel virtualization may be defined based on Equation 35 below.

$$f_{p_h(m),p_v(n)}^d(\varphi_c^a, \theta_c^a) = f_{ph(m)}^a(\varphi_i^a, \theta_i^a) f_{ph(m),p_v(n)}^e(\varphi_i^e, \theta_i^e)$$

[Equation 35]

$$\varphi_c = \varphi_i^a + \varphi_i^e$$
$$\theta_c = \theta_i^a + \theta_i^e$$
$$m = 1, 2, \ldots, N_{t_h}^a$$
$$n = 1, 2, \ldots, N_{t_v}^a$$

$$f_{m,n}^a(\varphi_i^a, \theta_i^a) = e^{j\frac{2\pi}{\lambda}\{(p_v-1)N_{t_v}^a d_{t_v}\cos\theta_c^a+(p_h-1)N_{t_h}^a d_{t_h}\sin\theta_c^a\sin\varphi_c^a\}}$$

$$f_{m,n}^e(\varphi_i^e, \theta_i^e) = \frac{1}{\sqrt{N_{t_h}^a N_{t_v}^a}} e^{j\frac{2\pi}{\lambda}\{(p_v-1)N_{t_v}^a d_{t_v}\sin\theta_i^e-(p_h-1)N_{t_h}^a d_{t_h}\cos\theta_i^e\sin\varphi_i^e\}}$$

In Equation 34, the array factor $F_{m,n}^{BF}$ may be defined based on Equation 36 below.

$$f_{m,n}^{BF} = f_{m,n}(\varphi_c, \theta_c) = f_{m,n}^a(\varphi_i^a, \theta_i^a) f_{m,n}^e(\varphi_i^e, \theta_i^e)$$

[Equation 36]

$$\varphi_c = \varphi_i^a + \varphi_i^e$$
$$\theta_c = \theta_i^a + \theta_i^e$$
$$m = 1, 2, \ldots, N_{t_h}^a$$
$$n = 1, 2, \ldots, N_{t_v}^a$$

$$f_{m,n}^a(\varphi_i^a, \theta_i^a) = e^{j\frac{2\pi}{\lambda}\{(n-1)d_{t_v}\cos\theta_i^a-(m-1)d_{t_h}\sin\theta_i^a\sin\varphi_i^a\}}$$

$$f_{m,n}^a(\varphi_i^e, \theta_i^e) = \frac{1}{\sqrt{N_{t_h}^a N_{t_v}^a}} e^{j\frac{2\pi}{\lambda}\{(n-1)d_{t_v}\sin\theta_i^e-(m-1)d_{t_h}\cos\theta_i^e\sin\varphi_i^e\}}$$

In Equation 34, $p_h$ (=1, 2, ..., $N_{ph}^{bc}$) may be a horizontal panel index for beam combining, $p_v$ (=1, 2, ..., $N_{pv}^{bc}$) may be a vertical panel index for beam combining, and $N_t^a$ (=$N_{t_h}^a N_{t_v}^a$) may be the number of antenna elements. The interval between the panels may be defined based on Equation 37 below.

$$d_g^H = N_{t_h}^a \times d_{t_h}$$
$$d_g^V = N_{t_v}^a \times d_{t_v}$$

[Equation 37]

The beam combining scheme 1 (e.g., weight and phase shift in the beam combining scheme 1) may be performed based on Equation 38 below $$f_{p_h(m),p_v(n)}^a(\varphi_c^a, \theta_c^a) =$$

[Equation 38]

$$f_{1(m),1(n)}^a(\varphi_{\{1\}}^a, \theta_{\{1\}}^a) = f_{2(m),1(m)}^a(\varphi_{\{2\}}^a, \theta_{\{1\}}^a) =$$
$$\ldots = f_{N_{ph}^{bc}(m),N_{pv}^{bc}(n)}^a\left(\varphi_{\{N_{ph}^{bc}\}}^a, \theta_{\{N_{pv}^{bc}\}}^a\right) =$$
$$\frac{1}{\sqrt{N_t^a N_p^{bc}}} e^{j\frac{2\pi}{\lambda}\{(n-1)d_{t_v}\cos\theta_c^a+(m-1)d_{t_h}\sin\theta_c^a\sin\varphi_c^a\}}$$

In Equation 38, $N_t^a$ (=$N_{t_h}^a N_{t_v}^a$) may be the number of antenna elements, m (=1, 2, ..., $N_{t_h}^a$) may be an antenna element index in the horizontal axis, n (=1, 2, ..., $N_{t_v}^a$) may be an antenna element index in the vertical axis, $p_h$ (=1, 2, ..., $N_{ph}^{bc}$) may be a horizontal panel index for beam combining, and $p_v$(=1, 2, ..., $N_{pv}^{bc}$) may be a vertical panel index for beam combining.

$\varphi_{\{ph\}}^a$ may be a beam steering angle for $p_h$(=1, 2, ..., $N_{ph}^{bc}$), and may be defined based on Equation 39 below.

$$\varphi_{\{ph\}}^c = \varphi_{\{ph\}}^a + \varphi_{\{ph\}}^e,$$

i.e., $\varphi_{\{ph\}}^c = \varphi_{\{1\}}^a = \varphi_{\{2\}}^a = \ldots = \varphi_{\{ph\}}^a$ & $\varphi_{\{ph\}}^e = 0$  [Equation 39]

$\theta_{\{pv\}}^a$ may be a beam steering angle for $p_v$ (=1, 2, ..., $N_{pv}^{bc}$), and may be defined based on Equation 40 below.

$$\theta_{\{pv\}}^c = \theta_{\{pv\}}^a + \theta_{\{pv\}}^e,$$

i.e., $\theta_{\{pv\}}^c = \theta_{\{1\}}^a = \theta_{\{2\}}^a = \ldots = \theta_{\{pv\}}^a$ & $\theta_{\{pv\}}^e = 0$  [Equation 40]

The beam combining scheme 2 (e.g., weight and phase shift in the beam combining scheme 2) may be performed based on Equation 41 below.

$$f_{p_h(m),p_v(n)}^a(\varphi_c^a, \theta_c^a) =$$

[Equation 41]

$$\frac{1}{\sqrt{N_t^a N_p^{bc}}} e^{j\frac{2\pi}{\lambda}\{(n_c-1)d_{t_v}\cos\theta_c^a(m_c-1)d_{t_h}\sin\theta_c^a\sin\varphi_c^a\}} = \frac{1}{\sqrt{N_t^a N_p^{bc}}}$$

$$e^{j\frac{2\pi}{\lambda}\{[(n-1)+(p_v-1)N_{t_v}^a]d_{t_v}\cos\theta_c^a+[(m-1)+(p_h-1)N_{t_h}^a]d_{t_h}\sin\theta_c^a\sin\varphi_c^a\}}$$

$$= \underbrace{e^{j\frac{2\pi}{\lambda}\{(n-1)d_{t_v}\cos\theta_c^a+(m-1)d_{t_h}\sin\theta_c^a\sin\varphi_c^a\}}}_{\text{phased arrayed @ antenna elements}} \times$$

$$\underbrace{\frac{1}{\sqrt{N_t^a N_p^{bc}}} e^{j\frac{2\pi}{\lambda}\{(p_v-1)N_{t_v}^a d_{t_v}\cos\theta_c^a+(p_h-1)N_{t_h}^a d_{t_h}\sin\theta_c^2\sin\varphi_c^a\}}}_{BBP}$$

In Equation 41, $N_t^a$ (=$N_{t_h}^a N_{t_v}^a$) may be the number of antenna elements, m(=1, 2, ..., $N_{t_h}^a$) may be an antenna element index in the horizontal axis, n(=1, 2, ..., $N_{t_v}^a$) may be an antenna element index in the vertical axis, $p_h$(=1, 2, ..., $N_{ph}^{bc}$) may be a horizontal panel index for beam combining, and $p_v$(=1, 2, ..., $N_{pv}^{bc}$) may be a vertical panel index for beam combining.

In Equation 41, me may be defined based on Equation 42 below, and $n_c$ may be defined based on Equation 43 below.

$$m_c = (1, 2, \ldots, N_{t_h}^a, N_{t_h}^a+1, \ldots, (N_{ph}^{bc}-1)N_{t_h}^a,$$
$$(N_{ph}^{bc}-1)N_{t_h}^a+1, \ldots, (N_{ph}^{bc})N_{t_h}^a)$$

[Equation 42]

$$n_c = (1, 2, \ldots, N_{t_v}^a, N_{t_v}^a+1, \ldots, (N_{pv}^{bc}-1)N_{t_v}^a,$$
$$(N_{pv}^{bc}-1)N_{t_v}^a+1, \ldots, (N_{pv}^{bc})N_{t_v}^a)$$

[Equation 43]

$\varphi_{\{ph\}}{}^a$ may be a beam steering angle for $p_h(=1, 2, \ldots, N_{ph}{}^{bc})$, and may be defined based on Equation 39 described above. $\theta_{\{pv\}}{}^a$ may be a beam steering angle for $p_v(=1, 2, \ldots, N_{pv}{}^{bc})$, and may be defined based on Equation 40 described above.

The beam combining scheme 3 (e.g., weight and phase shift in the beam combining scheme 3) may be performed based on Equation 44 below.

$$f_{P_h(m),P_v(n)}(\varphi_c, \theta_c) = f_{P_h(m),P_v(n)}(\varphi_{\{ph\}}^c, \theta_{\{pv\}}^c) = \quad [\text{Equation 44}]$$

$$f_{P_h(m),P_v(n)}(\varphi_{\{ph\}}^a + \varphi_{\{ph\}}^e, \theta_{\{pv\}}^a + \theta_{\{pv\}}^e)$$

$$f_{P_h(m),P_v(n)}^a(\varphi_{\{ph\}}^a, \theta_{\{pv\}}^a) f_{P_h(m),P_v(n)}^e(\varphi_{\{ph\}}^e, \theta_{\{pv\}}^e) =$$

$$f_{N_{ph}^{bc}(m),N_{pv}^{bc}(n)}^a\left(\varphi_{\{N_{ph}^{bc}\}}^a, \theta_{\{N_{pv}^{bc}\}}^a\right) f_{N_{ph}^{bc}(m),N_{pv}^{bc}(n)}^e\left(\begin{array}{c}\varphi_{\{N_{ph}^{bc}\}}^e,\\ \theta_{\{N_{pv}^{bc}\}}^e\end{array}\right) =$$

$$\underbrace{e^{j\frac{2\pi}{\lambda}\{(n-1)d_{t_v}\cos\theta_c^a + (m-1)d_{t_h}\sin\theta_c^a\sin\varphi_c^a\}}}_{\text{phased arrayed @ antenna elements}} \times$$

$$\underbrace{\frac{1}{\sqrt{N_t^a N_p^{bc}}} e^{j\frac{2\pi}{\lambda}\{(n-1)d_{t_v}\sin\theta_i^e - (m-1)d_{t_h}\cos\theta_i^e\sin\varphi_i^e\}}}_{\text{BBP}}$$

In Equation 44, $N_t^a (=N_{t_h}^a N_{t_v}^a)$ may be the number of antenna elements, $m(=1, 2, \ldots, N_{t_h}^a)$ may be an antenna element index in the horizontal axis, $n(=1, 2, \ldots, N_{t_v}^a)$ may be an antenna element index in the vertical axis, $p_h(=1, 2, \ldots, N_{ph}{}^{bc})$ may be a horizontal panel index for beam combining, and $p_v(=1, 2, \ldots, N_{pv}{}^{bc})$ may be a vertical panel index for beam combining. $\varphi_{\{ph\}}{}^a$ may be a beam steering angle for $p_h(=1, 2, \ldots, N_{ph}{}^{bc})$, and may be defined based on Equation 45 below.

$$\varphi^c = \varphi_{\{ph\}}^c = \varphi_{\{ph\}}^a + \varphi_{\{ph\}}^e, \quad [\text{Equation 45}]$$

$\theta_{\{pv\}}{}^a$ may be a beam steering angle for $p_v(=1, 2, \ldots, N_{pv}{}^{bc})$, and may be defined based on Equation 46 below.

$$\theta^c = \theta_{\{pv\}}^c = \theta_{\{pv\}}^a + \theta_{\{pv\}}^e \quad [\text{Equation 46}]$$

The beam combining scheme 4 (e.g., weight and phase shift in the beam combining scheme 4) may be performed based on Equation 47 below.

[Equation 47]

$$f_{P_h(m),P_v(n)}(\varphi_c, \theta_c) = f_{P_h(m),P_v(n)}(\varphi_{\{ph\}}^c, \theta_{\{pv\}}^c)$$

$$= f_{P_h(m),P_v(n)}(\varphi_{\{ph\}}^a + \varphi_{\{ph\}}^e, \theta_{\{pv\}}^a + \theta_{\{pv\}}^e)$$

$$= f_{P_h(m),P_v(n)}^a(\varphi_{\{ph\}}^a, \theta_{\{pv\}}^a) f_{P_h(m),P_v(n)}^e(\varphi_{\{ph\}}^e, \theta_{\{pv\}}^e)$$

$$= f_{N_{ph}^{bc}(m),N_{pv}^{bc}(n)}^a\left(\varphi_{\{N_{ph}^{bc}\}}^a, \theta_{\{N_{pv}^{bc}\}}^a\right)$$

$$f_{N_{ph}^{bc}(m),N_{pv}^{bc}(n)}^e\left(\varphi_{\{N_{ph}^{bc}\}}^e, \theta_{\{N_{pv}^{bc}\}}^e\right)$$

$$= e^{j\frac{2\pi}{\lambda}\{[(n-1)+(p_v-1)N_{tv}^a]d_{t_v}\cos\theta_c^a + [(m-1)+(p_h-1)N_{th}^a]d_{t_h}\sin\theta_c^a\sin\varphi_c^a\}} \times$$

$$e^{j\frac{2\pi}{\lambda}\{[(n-1)+(p_v-1)N_{tv}^a]d_{t_v}\sin\theta_i^e + [(m-1)+(p_h-1)N_{th}^a]d_{t_h}\cos\theta_c^e\sin\varphi_c^e\}}$$

$$= \underbrace{e^{j\frac{2\pi}{\lambda}\{(n-1)d_{t_v}\cos\theta_c^a + (m-1)d_{t_h}\sin\theta_c^a\sin\varphi_c^a\}}}_{\text{phased arrayed @ antenna elements}}$$

In Equation 47, $N_t^a (=N_{t_h}^a N_{t_v}^a)$ may be the number of antenna elements, $m(=1, 2, \ldots, N_{t_h}^a)$ may be an antenna element index in the horizontal axis, $n(=1, 2, \ldots, N_{t_v}^a)$ may be an antenna element index in the vertical axis, $p_h(=1, 2, \ldots, N_{ph}{}^{bc})$ may be a horizontal panel index for beam combining, and $p_v(=1, 2, \ldots, N_{pv}{}^{bc})$ may be a vertical panel index for beam combining.

$m_c$ may be defined based on Equation 42 described above, and $n_c$ may be defined based on Equation 43 described above. $\varphi_{\{ph\}}{}^a$ may be a beam steering angle for $p_h(=1, 2, \ldots, N_{ph}{}^{bc})$, and may be defined based on Equation 45 described above. $\theta_{\{pv\}}{}^a$ may be a beam steering angle for $p_v(=1, 2, \ldots, N_{pv}{}^{bc})$, and may be defined based on Equation 46 described above.

Meanwhile, when the panel virtualization is performed in the ABF step, the beam combining scheme 2 and the beam combining scheme 3 may be applied. When the panel virtualization is performed in the DBF step, the beam combining scheme 1, the beam combining scheme 3, and the beam combining scheme 4 may be applied. When the panel virtualization (e.g., beam combining) is performed, an antenna gain may be as follows.

Figure 21:
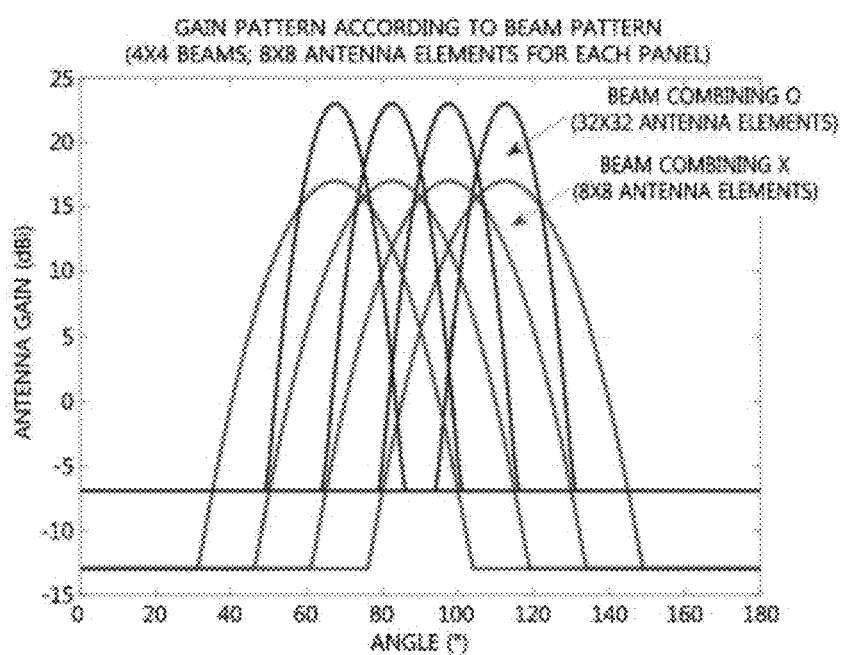
FIG. 21 is a graph illustrating a first embodiment of antenna gains and beam patterns in an embodiment in which panel virtualization is applied.

FIG. 21 is a graph illustrating a first embodiment of antenna gains and beam patterns in an embodiment in which panel virtualization is applied.

Referring to FIG. 21, beam patterns and antenna gains generated by 8×8 antenna elements in one panel may be identified, and beam patterns and antenna gains generated by 32×32 antenna elements formed through virtualization of 4×4 panels may be identified. When the panel virtualization is applied, a relatively narrow beam may be generated and a relatively high antenna gain may be obtained. Here, a coverage hole (e.g., a coverage hole in which −3 dB antenna gain occurs relative to that in boresight) may be compensated by the DBF.

Figure 22:
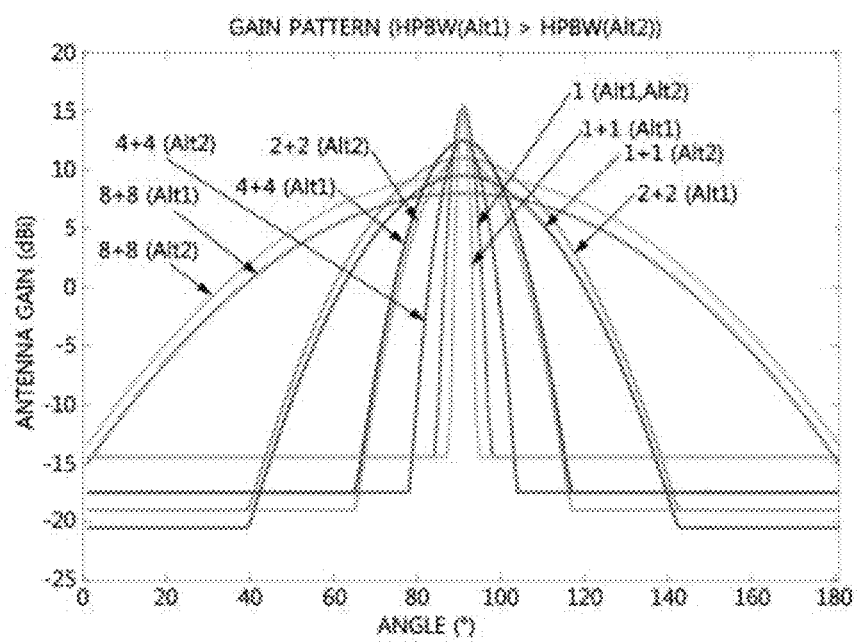
FIG. 22 is a graph illustrating a first embodiment of antenna gains and beam patterns according to beam combining schemes.

FIG. 22 is a graph illustrating a first embodiment of antenna gains and beam patterns according to beam combining schemes.

Referring to FIG. 22, 'Alt1' may indicate the beam combining scheme 1 and 'Alt2' may indicate the beam combining scheme 2. In the embodiment where 'Alt2' is applied, the beamwidth may be narrower than the beamwidth in the embodiment where 'Alt1' is applied. The more the number of panels to be virtualized (e.g., 1+1, 2+2, 4+4, 8+8), the more the antenna gain may be increased.

Combined Beam Codebook According to Panel-Based Beamforming $a_t(\varphi_i^c, \theta_i^c)$ may be a beamforming vector mapped to $(\varphi_i^c, \theta_i^c)$ in at least one panel, $a_t(\varphi_i^a, \theta_i^a)$ may indicate an analog beam, and $a_t(\varphi_i^e, \theta_i^e)$ may indicate a digital beam. $a_t(\varphi_i^c, \theta_i^c)$, $a_t(\varphi_i^a, \theta_i^a)$, and $a_t(\varphi_i^e, \theta_i^e)$ may be shared between a transmitter and a receiver. A codebook $\mathcal{A}_t$ for beam steering angles $(\varphi_i^c, \theta_i^c)$ according to the beam combining may be defined based on Equation 48 below.

$$|\mathcal{A}_t| = |\mathcal{A}_{t_h} \otimes \mathcal{A}_{t_v}| = N_b = N_b^h N_b^v \quad [\text{Equation 48}]$$

Maximum supportable steering angle with respect to the boresight of transmitter: $[-\theta_{max}, \theta_{max}]$ & $[-\varphi_{max}, \varphi_{max}]$ where $$0 < \theta_{max}, \varphi_{max} \leq \frac{\pi}{2}$$

$\mathcal{A}_t$ may be quantized according to an angle of a service area of a beam pattern (e.g., beamwidth, boresight) based on Equation 49 below.

$$\mathcal{A}_{t_h} = \{\varphi_{i,j} \mid \varphi_{i,j} = \varphi_i^a + \varphi_j^e,$$ [Equation 49]

$$i = 1, \ldots, 2^{N_b^h}, j = 1, \ldots, 2^{N_{e-b}^h}\}$$

$$= \{\varphi_{1,1}, \ldots, \varphi_{1,n} \ldots, \varphi_{m,1}, \ldots \varphi_{m,n}\},$$

$$\mathcal{A}_{t_v} = \{\theta_{i,j} \mid \theta_{i,j} = \theta_i^a + \theta_j^e,$$

$$i = 1, \ldots, 2^{N_b^v}, j = 1, \ldots, 2^{N_{e-b}^v}\}$$

$$= \{\theta_{1,1}, \ldots, \theta_{1,n} \ldots, \theta_{m,1}, \ldots \theta_{m,n}\},$$

Beam Measurement Procedure

In order to perform beam-related operations (e.g., beam selection operation, beam change operation, HARQ retransmission operation, link adaptation operation, etc.), the receiver may measure a channel state (e.g., beam state) between the receiver and the transmitter based on signals received from the transmitter. For example, the receiver may select an effective channel (i.e., $h_{eff}$) based on strengths of the signals (e.g., a reference signal, a synchronization signal) received according to beam patterns, and report information on a beam corresponding to the selected effective channel to the transmitter. The effective channel $h_{eff}$ may be determined based on Equation 50 below.

$$h_{eff} = a_r^H(\psi,\phi) HF_A(\overline{\varphi},\overline{\theta}) p_i$$

$$\psi \in \mathcal{A}_{r_h}, \phi \in \mathcal{A}_{r_v}, \overline{\theta} \in \Theta, \overline{\varphi} \in \Phi$$ [Equation 50]

In Equation 50, $\Theta$ may indicate a candidate set for selecting multiple transmission analog beams in the horizontal axis, and $\Phi$ may indicate a candidate set for selecting multiple transmission analog beams in the vertical axis. $\Theta$ and $\Phi$ each may be defined based on Equation 51 below.

$$\Theta = \{\overline{\theta}_k \mid \overline{\theta}_k = (\theta_1, \theta_2, \ldots, \theta_{N_t^c}), \forall \theta_i \in \mathcal{A}_{t_v}, k=1, \ldots, M_{t_v}'\},$$

$$\Phi = \{\overline{\varphi}_k \mid \overline{\varphi}_k = (\varphi_1, \varphi_2, \ldots, \varphi_{N_t^c}), \forall \varphi_i \in \mathcal{A}_{t_h}, k=1, \ldots, M_{t_h}'\},$$ [Equation 51]

where $M_{t_v}' = |\Theta|$ & maximum value is $2^{N_b^v \times N_t^c}$ $M_{t_h}' = |\Phi|$ & maximum value is $2^{N_b^h \times N_t^c}$ Beam Finding Procedure The beam finding procedure may include a step of finding an optimal beam among the beams (e.g., fixed beam, analog beam) generated at the analogue end, and a step of finding an optimal beam among the beams (e.g., digital beam, electronically tilted beam) generated at the digital end. In order to find an optimal beam through a measurement procedure of beams received through different spaces, the beam finding procedure may be performed ($N_b^h \times N_b^v$) times. In case that a receive beamforming is applied at the receiver, the number of times the beam finding procedure is performed may increase with the number of beams of the receiver. For example, the number of times the beam finding procedure is performed may be $M_r \times (N_b^h \times N_b^v)$. Here, $M_r$ may be the number of beams of the receiver. The beam finding procedure may be performed based on the following schemes.

Beam Finding Scheme 1

When a beam pattern for an analog beam (hereinafter referred to as an 'analog beam pattern') and a beam pattern for a digital beam (hereinafter referred to as a 'digital beam pattern') are respectively defined, the receiver may search a digital beam after completing the search of the analog beams.

Step 1: The receiver may receive signals (e.g., reference signal, synchronization signal, etc.) from the transmitter, and search (or, select), based on qualities of the received signals, at least one analog beam (e.g., analog beam having a received signal strength equal to or greater than a predetermined threshold value) among analog beams (e.g., analog beam patterns). The step 1 may be performed based on Equation 52 below. In Equation 52, $\overline{\varphi}$ may denote a directional angle of a horizontal analog beam in the analog beam patterns, and $\overline{\theta}$ may denote a directional angle of a vertical analog beam in the beam patterns.

$$f_{v,h_{eff}} = a_r^H(\psi,\phi) HF_A(\overline{\varphi},\overline{\theta})$$ [Equation 52]

Step 2: The receiver may search (or, select) an optimal digital beam (e.g., a digital beam having a received signal strength equal to or greater than a predetermined threshold value) among the beam pairs (e.g., a digital beam corresponding to the searched analog beam) searched in the step 1. The optimal digital beam may be determined based on the quality of the signal received from the transmitter. Here, the digital beam corresponding to the analog beam may be an electronically tilted beam based on the analog beam. Also, the receiver may search a digital precoding vector for the optimal digital beam. The step 2 may be performed based on Equation 53 below, and in Equation 53, each of $\hat{\Psi}$, $\hat{\phi}$, $\hat{\varphi}$, and $\hat{\theta}$ may indicate each of $\Psi$, $\phi$, $\varphi$, and $\theta$ selected in the step 1.

$$f_{d,h_{eff}} = \max \|a_r^H(\hat{\psi},\hat{\phi}) HF_A(\hat{\varphi},\hat{\theta})\|_2^2$$ [Equation 53]

Beam Finding Scheme 2

Step 1: The receiver may receive signals (e.g., reference signal, synchronization signal, etc.) from the transmitter and may search (or, select), based on qualities of the received signals, at least one horizontal analog beam (e.g., analog beam having a received signal strength equal to or greater than a preset threshold value) among horizontal analog beams. The step 1 may be performed based on Equation 54 below. In Equation 54, $\varphi_i$ may be an arbitrary horizontal analog beam (e.g., a directional angle of the arbitrary horizontal analog beam) in the analog beam patterns.

$$f_{v,h_{eff}} = a_r^H(\psi,\phi) HF_A(\varphi_i,\overline{\theta})$$ [Equation 54]

Step 2: The receiver may search (or, select), based on qualities of the received signals, at least one vertical analog beam (e.g., analog beam having a received signal strength equal to or greater than a preset threshold value) among vertical analog beams. The step 2 may be performed based on Equation 55 below, and in Equation 55, each of $\hat{\Psi}$, $\hat{\phi}$, and $\hat{\theta}$ may indicate each of $\Psi$, $\phi$, and $\theta$ selected based on $f_{v,h_{eff}}$.

$$f_{h,h_{eff}} = a_r^H(\hat{\psi},\hat{\phi}) HF_A(\overline{\varphi},\hat{\theta})$$ [Equation 55]

Step 3: The receiver may search (or, select) an optimal digital beam (e.g., a digital beam having a received signal strength equal to or greater than a predetermined threshold value) among the beam pairs (e.g., a digital beam corresponding to the searched vertical analog beam and horizontal analog beam) searched in the steps 1 and 2. The optimal digital beam may be determined based on the quality of the signal received from the transmitter. Here, the digital beam corresponding to the horizontal analog beam and vertical analog beam may be an electronically tilted beam based on the corresponding analog beams. Also, the receiver may search a digital precoding vector for the optimal digital beam. The step 3 may be performed based on Equation 56 below.

$$f_{d,h_{eff}} = \max \|a_r^H(\hat{\psi},\hat{\phi}) HF_A(\hat{\varphi},\hat{\theta})\|_2^2$$ [Equation 56]

Beam Finding Scheme 3

Step 1: The receiver may receive signals (e.g., reference signal, synchronization signal, etc.) from the transmitter and may search (or, select), based on qualities of the received signals, at least one horizontal analog beam (e.g., analog beam having a received signal strength equal to or greater than a preset threshold value) among horizontal analog beams. The step 1 may be performed based on Equation 54 described above.

Step 2: The receiver may search (or, select), based on qualities of the received signals, at least one vertical analog beam (e.g., analog beam having a received signal strength equal to or greater than a preset threshold value) among vertical analog beams. The step 2 may be performed based on Equation 55 described above.

Step 3: The receiver may search (or, select) an optimal horizontal digital beam (e.g., a digital beam having a received signal strength equal to or greater than a predetermined threshold value) among the beam pairs (e.g., a horizontal digital beam corresponding to the searched horizontal analog beam) searched in the step 1. The optimal horizontal digital beam may be determined based on the qualities of the signals received from the transmitter. Here, the horizontal digital beam corresponding to the horizontal analog beam may be an electronically tilted beam based on the corresponding analog beam. In Equation 57, each of $\hat{\Psi}$, $\hat{\phi}$, $\hat{\varphi}$, and $\hat{\theta}$ may be each of $\Psi$, $\phi$, $\varphi$, and $\theta$ selected based on $f_{d_h,h_{\mathit{eff}}}$, and $\varphi_{e,i}$ may be an arbitrary horizontal digital beam (e.g., a directional angle of the arbitrary horizontal digital beam) in the digital beam patterns.

$$f_{d_h,h_{\mathit{eff}}} = a_r^H(\hat{\psi},\hat{\phi})HF_A(\hat{\varphi},\hat{\theta})F_D(\varphi_{e,i}\overline{\theta}_e) \quad [\text{Equation 57}]$$

Step 4: The receiver may search (or, select) an optimal vertical digital beam (e.g., a digital beam having a received signal strength equal to or greater than a predetermined threshold value) among the beam pairs (e.g., a vertical digital beam corresponding to the searched vertical analog beam) searched in the step 2.

The optimal vertical digital beam may be determined based on the qualities of the signals received from the transmitter. Here, the vertical digital beam corresponding to the vertical analog beam may be an electronically tilted beam based on the corresponding analog beam. The step 4 may be performed based on Equation 58 below, and $\hat{\theta}_e$ may be $\theta_e$ selected based on $f_{d_v,h_{\mathit{eff}}}$.

$$f_{d_v,h_{\mathit{eff}}} = \max \|a_r^H(\hat{\psi},\hat{\phi})HF_A(\hat{\varphi},\hat{\theta})F_D(\overline{\varphi}_e,\hat{\theta}_e)\|_2^2 \quad [\text{Equation 58}]$$

Meanwhile, according to the beam finding schemes 1 to 3 described above, a finding delay may occur. The finding delay may be as follows.

Figure 23:
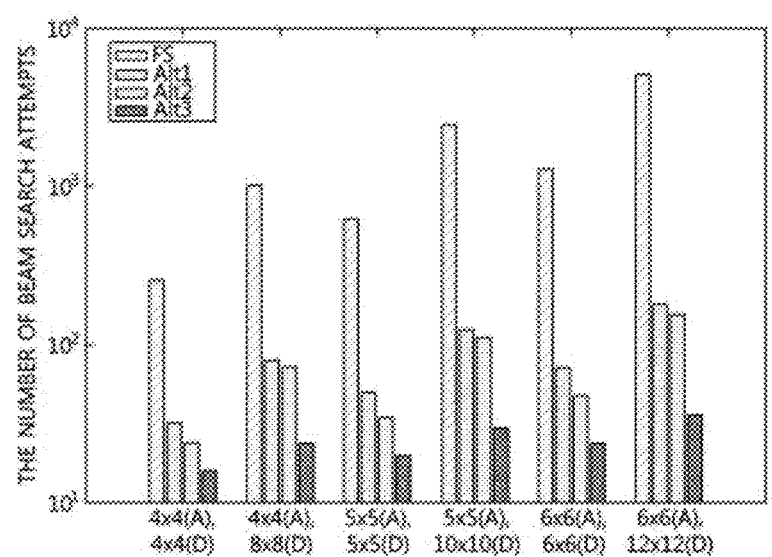
FIG. 23 is a graph illustrating a finding delay according to the beam finding schemes.

FIG. 23 is a graph illustrating a finding delay according to the beam finding schemes.

Referring to FIG. 23, 'Alt1' may indicate the beam finding scheme 1, 'Alt2' may indicate the beam finding scheme 2, 'Alt3' may indicate the beam finding scheme 3, and a full search (FS) may indicate a manner in which all beams are searched. Also, 'A' may indicate analog beams, and 'D' may indicate digital beams. The number of beam search attempts of FS may be greater than the number of beam search attempts of each of Alt1, Alt2 and Alt3, and the number of beam search of Alt3 may be the smallest. For example, the beam search complexity (e.g., the number of beam search attempts) of FS may be $(N_b^h \times N_b^v \times N_{b-e}^h \times N_{b-e}^v)$, the beam search complexity of Alt1 may be $(N_b^h \times N_b^v + N_{b-e}^h \times N_{b-e}^v)$, the beam search complexity of Alt2 may be $(N_b^h + N_b^v + N_{b-e}^h \times N_{b-e}^v)$, and the beam search complexity of Alt3 may be $(N_b^h + N_b^v + N_{b-e}^h + N_{b-e}^v)$.

Beam Measurement Procedure

In a beam measurement procedure, a beam state (e.g., channel state) may be measured and the beam state may be measured in a measurement resource unit (MRU). The MRU may be a subcarrier to which a signal (hereinafter referred to as a 'beam measurement signal') used for measuring the beam state is allocated among the subcarriers. The beam measurement signal may be a reference signal (RS), a synchronization signal (SS), a beam measurement reference signal (BM-RS), a beam sweeping signal (BWS or BSW signal), or the like. The beam measurement procedure may be classified as shown in Table 6 below.

TABLE 6

| Classification | Measurement scheme | Measurement means |
|---|---|---|
| Search of beam pair | $F_d(h_{\mathit{eff}}) = \max\|a_r^H(\hat{\psi},\hat{\phi})HF_A(\overline{\varphi},\overline{\theta})\|_2^2$ | SS, BSW and/or BM-RS |
| Beam measurement based on BM-RS | $F_m(\overline{\varphi_J},\overline{\theta_J}) = \sum_{k=0}^{N_{sc,j}^{BM-RS}-1} \left\|a_r^H(\hat{\psi},\hat{\phi})HF_A(\overline{\varphi_J},\overline{\theta_J})[k]\right\|^2$ | BM-RS |
| Interference measurement based on BM-RS-IM | $F_I(\overline{\varphi_J},\overline{\theta_J}) = \sum_{k=0}^{N_{sc}^{RS}-1} \|I[k]+N[k]\|^2$ | |
| SINR | $F_{SINR}(\overline{\varphi_J},\overline{\theta_J}) = \dfrac{\sum_{k=0}^{N_{sc}-1} RSS[k]}{\sum_{k=0}^{N_{sc}-1} RSSI[k] - \sum_{k=0}^{N_{sc}-1} RSS[k]}$ or $\sum_{k=0}^{N_{sc}-1} SINR[k]$ | BM-RS and/or Data subcarrier |

Wherein

TABLE 6-continued

| Classification | Measurement scheme | Measurement means |
| --- | --- | --- |
| | $RSSI[k] = \|s[k] + I[k] + N[k]\|_2^2$ : RSSI for subcarrier k | |
| | $RSS[k] = \|s[k]\|_2^2$ : RSS for subcarrier k | |
| | $SINR[k] = \dfrac{RSS[k]}{RSSI[k] - RSS[k]}$ | |
| Interference in subcarrier k | $RSSI[k] - RSS[k] = \|s[k] + I[k] + N[k]\|_2^2 - \|s[k]\|_2^2$ | |
| RSSI for subcarrier k | $RSSI[k] = \|s[k] + I[k] + N[k]\|_2^2 = \|a_r^H(\hat{\psi}, \hat{\phi})H[k]F_A(\varphi, \theta)\|_2^2$ (RSSI in reception beam) | |
| RSS for subcarrier k | $RSS[k] = \|s[k]\|_2^2 = \|a_r^H(\hat{\psi}, \hat{\phi})H[k]F_A(\hat{\varphi}, \hat{\theta})\|_2^2$ (RSS in selected beam pair) | |

In the beam measurement procedure, the measurement result may be converted in units of dB or dBm, and the receiver may report the converted value to the transmitter. Alternatively, the receiver may quantize the measurement results and report the quantized values to the transmitter. Alternatively, the receiver may report signal to interference plus noise ratio (SINR), received signal strength indicator (RSSI), or received signal strength (RSS) to the transmitter as the measurement result. In this case, the transmitter may estimate the SINR based on RSSI or RSS.

Figure 24:
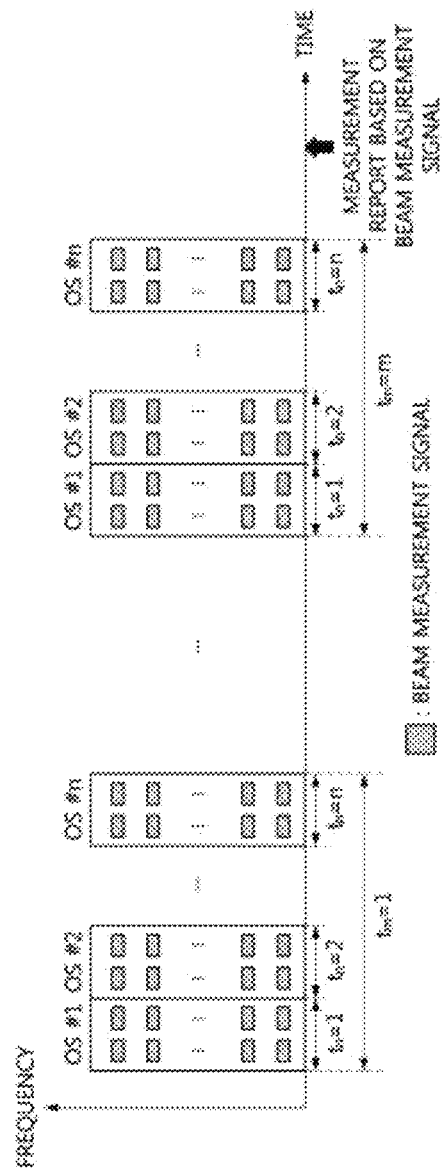
FIG. 24 is a conceptual diagram illustrating a first embodiment of a beam measurement procedure.

FIG. 24 is a conceptual diagram illustrating a first embodiment of a beam measurement procedure.

Referring to FIG. 24, the transmitter may transmit a beam measurement signal (e.g., reference signal, synchronization signal, BM-RS, BWS, etc.). The beam measurement signal may be transmitted based on a predetermined periodicity. Here, each of m and n may be an integer equal to or greater than 1. The $N_{sc}^{BM-RS}$ beam measurement signals may be transmitted in a period corresponding to one n (hereinafter referred to as 'OS'). The receiver may perform beam measurement based on the beam measurement signal received from the transmitter and report a measurement results to the transmitter. The measurement result ($\overline{f_m(\overline{\varphi_j}, \overline{\theta_j})}[t_m]$) in the period tm may be calculated based on Equation 59 below. For example, the measurement result in the period tm may be calculated based on the measured value in the previous period ($t_m-1$) and the measured value in the current period $t_m$.

$$\overline{f_m(\overline{\varphi_J}, \overline{\theta_J})}[t_m] = \qquad \text{[Equation 59]}$$

$$\begin{cases} f_n(\overline{\varphi_J}, \overline{\theta_J})[t_m], & \text{if } t_m = 0 \\ (1 - a_m) \times \overline{f_m(\overline{\varphi_J}, \overline{\theta_J})}[t_m - 1] + & \\ \alpha_m \times f_m(\overline{\varphi_J}, \overline{\theta_J})[t_m], & \text{otherwise} \end{cases}$$

$a_m$ ($\geq 0$) may be a running averaging parameter. $\overline{f_m(\overline{\varphi_j}, \overline{\theta_j})}[t_m]$ may be a measurement value of the beam measurement signal during n periods in the periods satisfying '$t_m=m$', and may be defined based on Equation 60 below.

$$f_m(\overline{\varphi_j}, \overline{\theta_j})[t_m] = \overline{f_n(\overline{\varphi_j}, \overline{\theta_j})}[t_n = n-1] \qquad \text{[Equation 60]}$$

$\overline{f_n(\overline{\varphi_j}, \overline{\theta_j})}[t_n=n]$ may be calculated based on the measured value ($\overline{f_n(\overline{\varphi_j}, \overline{\theta_j})}[t_n=n-1]$) until the previous period ($t_n=n-1$) and the measured value in the current period ($t_n=n$). For example, $\overline{f_n(\overline{\varphi_j}, \overline{\theta_j})}[t_n=n]$ may be calculated based on Equation 61 below. Here, $a_n$ ($\geq 0$) may be a running averaging parameter $$\overline{f_n(\overline{\varphi_J}, \overline{\theta_J})}[t_n] = \begin{cases} f_n(\overline{\varphi_J}, \overline{\theta_J})[t_n], & \text{if } t_n = 0 \\ (1 - \alpha_n) \times \overline{f_n(\overline{\varphi_J}, \overline{\theta_J})}[t_n - 1] + & \\ \alpha_n \times f_n(\overline{\varphi_J}, \overline{\theta_J})[t_n], & \text{otherwise} \end{cases} \qquad \text{[Equation 61]}$$

$\overline{f_n(\overline{\varphi_j}, \overline{\theta_j})}[t_n=n]$ may be calculated based on at least one beam measurement signal in the period satisfying '$t_n=n$', and may be defined based on Equation 62 below.

$$f_n(\overline{\varphi_j}, \overline{\theta_j})[t_n=n] = \overline{f_0(\varphi_j, \theta_j)}[t_{os}=OS-1] \qquad \text{[Equation 62]}$$

$\overline{f_0(\overline{\varphi_j}, \overline{\theta_j})}[t_{OS}=OS]$ may be calculated based on the measured value ($\overline{f_0(\overline{\varphi_j}, \overline{\theta_j})}[t_{OS}-1]$) until the previous period ($t_{OS}=OS-1$) and the measured value in the current period ($t_{OS}=OS$). For example, $\overline{f_0(\overline{\varphi_j}, \overline{\theta_j})}[t_{OS}=OS]$ may be calculated based on Equation 63 below. Here, $\alpha_{OS}$ ($\geq 0$) may be a running averaging parameter.

$$\overline{f_0(\overline{\varphi_J}, \overline{\theta_J})}[t_{os}] = \qquad \text{[Equation 63]}$$

$$\begin{cases} f_o(\overline{\varphi_J}, \overline{\theta_J})[t_{os}], & \text{if } t_{os} = 0 \\ (1 - \alpha_{OS}) \times \overline{f_o(\overline{\varphi_J}, \overline{\theta_J})}[t_{os} - 1] + & \\ \alpha_{OS} \times f(\overline{\varphi_J}, \overline{\theta_J})[t_{os}], & \text{otherwise} \end{cases}$$

$f(\overline{\varphi_j}, \overline{\theta_j})[t_{os}]$ may be a measurement value of the beam measurement signal in the period of '$t_{OS}=OS$', and may be calculated based on Equation 64 below.

$$\overline{f_0(\overline{\varphi_J}, \overline{\theta_J})}[t_{os}] = \sum_{k=0}^{N_{sc}^{BM-BS}-1} \left| a_x^H(\hat{\psi}, \hat{\phi}) H F_A(\overline{\varphi_J}, \overline{\theta_J})[k] \right|^2 \qquad \text{[Equation 64]}$$

$N_{SC,j}^{BM-RS}$ may indicate the number of subcarriers in OFDM symbols allocated for the beam measurement signal #j (i.e., BM-RS #j) for each analog beam for the RF chain of the transmitter, and each of $\overline{\varphi_j}$ and $\overline{\theta_j}$ may be φ and θ preset between the transmitter and the receiver for the measurement of the BM-RS #j. Θ may indicate a candidate set for selecting multiple transmission analog beams in the horizontal axis, and Φ may indicate a candidate set for selecting multiple transmission analog beams in the vertical axis. Θ and Φ each may be defined based on Equation 65 below.

$$\overline{\theta} \in \Theta, \overline{\varphi} \in \Phi \qquad \text{[Equation 65]}$$

Θ,Φ: the set of candidates for selecting the multiple transmit analog beams y-axis (horizontal), z-axis (vertical), respectively $\Theta = \{\overline{\theta}_k | \overline{\theta}_k = (\theta_1, \theta_2, \ldots, \theta_{N_t^c}), \forall \theta_i \in \mathcal{A}_{t_v}, k=1, \ldots, M_{t_v}'\}$, $\Phi = \{\overline{\varphi}_k | \overline{\varphi}_k = (\varphi_1, \varphi_2, \ldots, \varphi_{N_t^c}), \forall \varphi_i \in \mathcal{A}_{t_H}, k=1, \ldots, M_{t_H}'\}$, where $M_{t_v}' = |\Theta|$ & maximum value is $2^{N_b^v \times N_t^c}$
$M_{t_H}' = |\Phi|$ & maximum value is $2^{N_b^h \times N_t^c}$ Alternatively, $f(\overline{\varphi}_j, \overline{\theta}_j)[t_{os}]$ may be calculated based one Equations 66 to 69 below.

$$f(\overline{\varphi_J}, \overline{\theta_J})[t_{os}] = \frac{\sum_{k=0}^{N_{sc}-1} |s[k]|^2}{\sum_{k=0}^{N_{sc}-1} ||s[k]| - r[k]|^2}, \quad [\text{Equation 66}]$$

$$f(\overline{\varphi_J}, \overline{\theta_J})[t_{os}] = 0 \text{ if } \sum_{k=0}^{N_{sc}-1} ||s[k]| - r[k]|^2 = 0,$$

$$f(\overline{\varphi_J}, \overline{\theta_J})[t_{os}] = \sum_{k=0}^{N_{sc}-1} \frac{|s[k]|^2}{||s[k]| - r[k]|^2}, \quad [\text{Equation 67}]$$

$$\frac{|s[k]|^2}{||s[k]| - r[k]|^2} = 0 \text{ if } ||s[k]| - r[k]|^2 = 0,$$

$$f(\overline{\varphi_J}, \overline{\theta_J})[t_{os}] = \sum_{k=0}^{N_{sc}-1} \frac{|r[k]|^2}{|RSSI[k]|^2 - |r[k]|^2}, \quad [\text{Equation 68}]$$

$$\frac{|r[k]|^2}{|RSSI[k]|^2 - |r[k]|^2} = 0 \text{ if } |RSSI|^2 - |r[k]|^2 = 0,$$

$$f(\overline{\varphi_J}, \overline{\theta_J})[t_{os}] = \frac{\sum_{k=0}^{N_{sc}-1} |r[k]|^2}{\sum_{k=0}^{N_{sc}-1} |RSSI[k]|^2 - |r[k]|^2}, \quad [\text{Equation 69}]$$

$$f(\overline{\varphi_J}, \overline{\theta_J})[t_{os}] = 0 \text{ if } \sum_{k=0}^{N_{sc}-1} |RSSI|^2 - |r[k]|^2 = 0,$$

$N_{SC}$ may indicate the number of subcarriers in OFDM symbols for measurement of physical channel state information at the transmitter. For example, $N_{SC}$ may indicate the number of total subcarriers in one MRU or a plurality of MRUs (e.g., the maximum system bandwidth). Alternatively, when the channel is measured based on the reference signal RS, $N_{SC}$ may be set to $N_{SC,j}^{RS}$. $N_{SC,j}^{RS}$ may indicate the number of subcarriers in OFDM symbols allocated for analog beam-specific reference signals (i.e., RS #j) for the RF chain of the transmitter.

s[k] may indicate a transmission power of a signal (e.g., a reference signal (RS), sample, message) transmitted through the k-th subcarrier. s[k] may be defined or indicated prior to transmission of the signal. r[k] may indicate a reception power of a signal (e.g., a reference signal (RS), sample, message) received through the k-th subcarrier. Here, r[k] may indicate a reception power of the received signal excluding interference and noise, and may be defined based on Equation 70 below.

$$r[k] = a_r^H(\hat{\psi}, \hat{\varphi}) H F_A(\overline{\varphi_j}, \overline{\theta_j})[k] \quad [\text{Equation 70}]$$

Each of $\overline{\varphi}_j$ and $\overline{\theta}_j$ may be $\varphi$ and $\theta$ preset between the transmitter and the receiver for the measurement of the RS #j, $\Theta$ may indicate a candidate set for selecting multiple transmission analog beams in the horizontal axis, and $\Phi$ may indicate a candidate set for selecting multiple transmission analog beams in the vertical axis. $\Theta$ and $\Phi$ each may be defined based on Equation 65 described above. RSSI[k] may indicate the reception power of a signal (e.g., RS, sample, message) received through the k-th subcarrier. Here, RSSI [k] may indicate a reception power of the received signal including interference and noise.

The receiver may comprise at least one antenna used for beam measurement, in which case Equation 71 below may be used.

$$\sum_{r=1}^{N_r^a} \overline{f_{m_r}}(\overline{\varphi_j}, \overline{\theta_j})[t_m] \quad [\text{Equation 71}]$$

$\overline{f_{m_r}}(\overline{\varphi_j}, \overline{\theta}_j)[t_m]$ may be $\overline{f_m}(\overline{\varphi_j}, \overline{\theta_j})[t_m]$ of an antenna #r of the receiver performing beam measurements, and $N_r^a$ may indicate the number of antennas (e.g., antenna elements) that perform beam measurements at the receiver. The receiver may calculate an average value of values measured at all the antennas that perform the beam measurement, and report the average value to the transmitter. Here, the average value may be calculated based on Equation 72 below.

$$\frac{1}{N_r^a} \sum_{r=1}^{N_r^a} \overline{f_{m_r}}(\overline{\varphi_J}, \overline{\theta_J})[t_m] \quad [\text{Equation 72}]$$

Meanwhile, when communication services are provided through a plurality of beams in a sector, interference between the beams may occur. If one transmitter provides communication services in a plurality of sectors that is distinguished in the spatial domain, interference may occur between the sectors. If adjacent transmitters transmit signals, interference may occur between the adjacent transmitters. The interference described above may be measured through beam measurement-interference measurement (BM-IM) and resources (e.g., resource element (RE), subcarrier, symbol) for the BM-IM may be configured. The receiver may measure beam interference in the resources for the BM-IM, and the transmitter may not transmit any signal through the resources configured for the BM-IM. The receiver may measure $$\overline{f_m}(\overline{\varphi_J}, \overline{\theta_J})[t_m], \sum_{r=1}^{N_r^a} \overline{f_{m_r}}(\overline{\varphi_J}, \overline{\theta_J})[t_m], \text{ and}$$

$$\frac{1}{N_r^a} \sum_{r=1}^{N_r^a} \overline{f_{m_r}}(\overline{\varphi_J}, \overline{\theta_J})[t_m],$$

and report the measured values to the transmitter.

Figure 25:
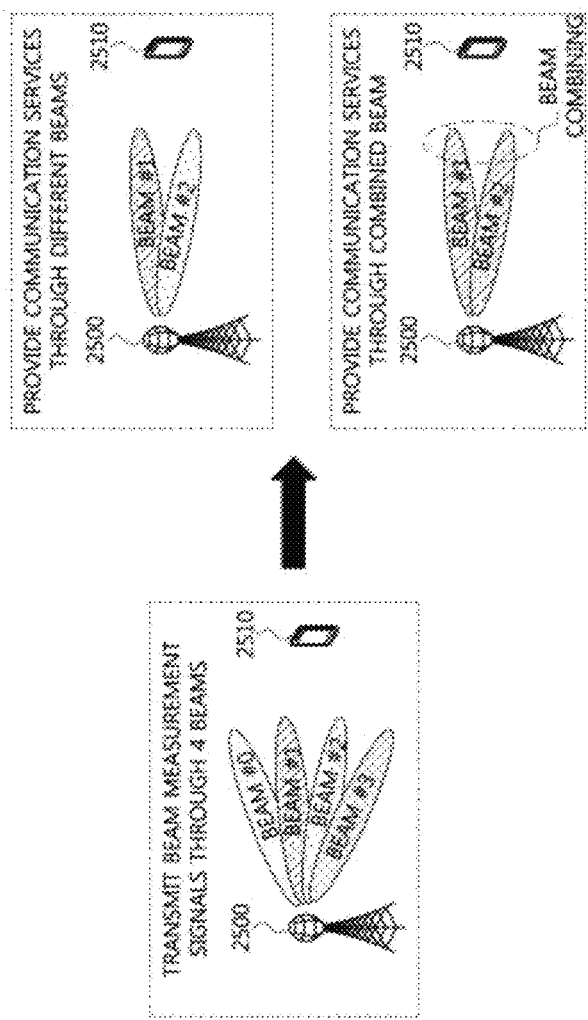
FIG. 25 is a conceptual diagram illustrating a second embodiment of a beam measurement procedure.

FIG. 25 is a conceptual diagram illustrating a second embodiment of a beam measurement procedure.

Referring to FIG. 25, a base station 2500 may transmit beam measurement signals (e.g., reference signal, BM-RS, synchronization signal, BSW signal) through four beams (e.g., beam #0, beam #1, beam #2, and beam #3). Here, indices of the four beams may be different from each other, and the beam measurement signals may be transmitted in a beamforming manner. The beam measurement signals may be transmitted based on the following schemes.

FIG. 26A is a timing chart illustrating a first embodiment of a beam measurement signal transmission method.

Referring to FIG. 26A, a base station 2500 may transmit a BSW signal and a BM-RS used for beam measurement.

Each of the BSW signal and the BM-RS may be periodically transmitted, and the BM-RS may be transmitted in a beamforming manner.

FIG. 26B is a timing chart illustrating a second embodiment of a beam measurement signal transmission method.

Referring to FIG. 26B, a base station 2500 may transmit a BSW signal, a BM-RS, and a combined BM-RS used for beam measurement. The combined BM-RS may be a BM-RS transmitted through a combined beam. The BSW signal, the BM-RS, and the combined BM-RS may be periodically transmitted, and the BM-RS and the combined BM-RS may be transmitted in a beamforming manner.

Referring again to FIG. 25, a terminal 2510 may perform beam measurement based on the beam measurement signals received from the base station. For example, the terminal 2510 may select at least one beam whose beam measurement results meet predetermined criteria (e.g., at least one beam having a received signal strength equal to or greater than a predetermined threshold). If the beams meeting the predetermined criteria are beam #1 and beam #2, the terminal 2510 may transmit to the base station 2500 information (e.g. beam indexes) indicating the beam #1 and beam #2.

The base station 2500 may receive the information on the beams (e.g., beam #1 and beam #2) selected based on the beam measurement signals from the terminal 2510, and use the beam #1 and beam #2 to provide communication services to the terminal 2510. In this case, the base station 2500 may provide a communication services to the terminal 2510 using the beams #1 and #2 having different indexes. Alternatively, base station 2500 may provide communication services to terminal 2510 using a combined beam (e.g., a combined beam of the beams #1 and #2). For example, if a measurement result based on a combined BM-RS (e.g., a BM-RS transmitted via the combined beam of the beams #1 and #2) is received from the terminal 2510, the base station 2500 may know that the measurement result is based on the combined BM-RS, and provide communication services to the terminal 2510 using the combined beam of the beams #1 and #2 indicated by the measurement result.

Meanwhile, the beam measurement signal may be transmitted over some or all of the time-frequency resources. If the beam measurement signal is transmitted over a time-frequency resource shared with other signals (e.g., control information, user data, other reference signal, other beam measurement signal), the receiver should be able to recognize that the received signal is the beam measurement signal.

Thus, a resource pool for the beam measurement signals may be configured, and resources belonging to the resource pool may be respectively mapped to the beam measurement signals. For example, each of the beam measurement signals may be mapped to a different resource in the resource pool, the base station may transmit a plurality of beam measurement signals using different resources in the resource pool, and the terminal may identify its beam measurement signal based on information on the mapping.

The resource pool may be configured in units of time resources (e.g., a subframe, a transmission time interval (TTI), a slot, etc.) and may be periodically configured in the time axis. Periodic beam measurement procedures may be performed based on the resource pool. When the beam measurement procedure is triggered by the transmitter, a message triggering the beam measurement procedure may include information on the resource pool. Also, the resource pool may be configured in units of frequency resources (e.g., physical radio unit or physical resource unit (PRU), sub-band, subchannel). For example, an entire frequency resource or some frequency resources may be allocated for the resource pool. Also, the resource pool may be configured in units of time-frequency resources, and may be configured in units of spatial resources (e.g., beam index). A plurality of resource pools may be configured and each of the plurality of resource pools may not be used for transmission of other signals (e.g., control information, user data, other reference signals, other beam measurement signals).

Within the resource pool, the beam measurement signals may be configured to be distinguishable in the time axis and/or the frequency axis. For example, the beam measurement signals may be configured in units of OFDM symbols (e.g., consecutive OFDM symbols) in the time axis and may be configured in units of subcarriers (e.g., consecutive subcarriers). A particular resource (e.g., resource element (RE), tone, symbol, etc.) within a resource pool may be mapped to a beam measurement signal. When there are many beam measurement signals, a plurality of resource pools may be configured. Also, when there are a plurality of receivers, a resource pool for each of the plurality of receivers may be configured independently.

Meanwhile, the beam measurement signals may be configured in a resource pool (e.g., MRU), and the beam measurement signals in the MRU may be configured as follows.

Figure 27:
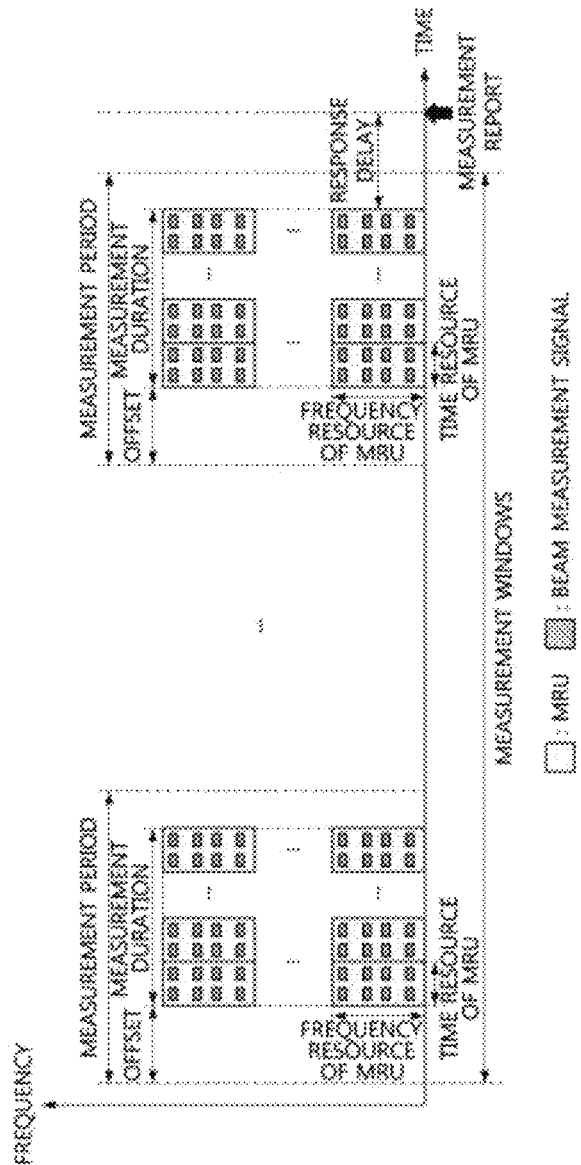
FIG. 27 is a conceptual diagram illustrating a configuration of beam measurement signals in an MRU.

FIG. 27 is a conceptual diagram illustrating a configuration of beam measurement signals in an MRU.

Referring to FIG. 27, at least one measurement period may be configured within a measurement window, at least one measurement duration may be configured within each of the at least one measurement period, and at least one MRU may be configured within each of the at least one measurement duration. The beam measurement procedure may be performed within the measurement duration, and the measurement duration may begin after a predetermined offset from a starting point of the measurement period. The measurement report may be performed after a response delay from an ending point of the measurement duration.

The MRU may be a minimum resource unit configured for the beam measurement procedure. An MRU may be composed of one OFDM symbol or consecutive OFDM symbols (e.g., frame, subframe, TTI, slot) in the time axis, and may be composed of one subcarrier or consecutive subcarriers (e.g., resource block (RB), subband, subchannel, or an entire frequency band). At least one beam measurement signal may be configured in the MRU, and the beam measurement signals may be configured to be distinguished in at least one of time domain, frequency domain, and spatial domain.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. A communication method based on hybrid beamforming, performed in a receiver of a communication system, the communication method comprising:
   receiving reference signals from a transmitter of the communication system through beams to which the hybrid beamforming is applied;
   selecting at least one analog beam having a quality equal to or higher than a preset threshold value among analog beams belonging to the beams, based on the reference signals;
   selecting at least one digital beam corresponding to the at least one analog beam and having a quality equal to or higher than the preset threshold value among digital beams belonging to the beams, based on the reference signals; and
   transmitting information indicating at least one of the at least one analog beam and the at least one digital beam to the transmitter.

2. The communication method according to claim 1, wherein the selecting at least one analog beam further comprises:
   selecting at least one horizontal analog beam having a quality equal to or higher than the preset threshold value among horizontal analog beams belonging to the analog beams; and
   selecting at least one vertical analog beam having a quality equal to or higher than the preset threshold value among vertical analog beams belonging to the analog beams.

3. The communication method according to claim 2, wherein the at least one vertical analog beam is vertically arranged with the at least one horizontal analog beam.

4. The communication method according to claim 2, wherein the selecting at least one digital beam further comprises:
   selecting at least one horizontal digital beam corresponding to the at least one horizontal analog beam and having a quality equal to or higher than the preset threshold value among horizontal digital beams belonging to the digital beams; and
   selecting at least one vertical digital beam corresponding to the at least one vertical analog beam and having a quality equal to or higher than the preset threshold value among vertical digital beams belonging to the digital beams.

5. The communication method according to claim 4, wherein the at least one vertical digital beam is vertically arranged with the at least one horizontal digital beam.

6. The communication method according to claim 1, wherein the reference signals are received through a combined beam of the transmitter.

7. The communication method according to claim 1, wherein the digital beams are generated by electrical tilting of the analog beams.

8. The communication method according to claim 1, wherein the selecting at least one digital beam further comprises identifying a precoding vector of the at least one digital beam.

9. A communication method based on hybrid beamforming, performed in a transmitting of a communication system, the communication method comprising:
   transmitting reference signals using analog beams and digital beams;
   receiving, from a receiver of the communication system, information indicating at least one of at least one analog beam and at least one digital beam selected based on the reference signals; and
   performing communications with the receiver using at least one of the at least one analog beam and the at least one digital beam,
   wherein an antenna module of the transmitter includes a plurality of beamformers supporting different sectors, each of the plurality of beamformers includes a plurality of panels each of which includes a plurality of antenna elements, and the analog beams and the digital beams are transmitted by a single beamformer.

10. The communication method according to claim 9, wherein the reference signals are transmitted through time-frequency resources other than time-frequency resources configured for interference measurement.

11. The communication method according to claim 9, wherein the at least one digital beam is generated by electrical tilting of the at least one analog beam.

12. The communication method according to claim 9, wherein the reference signals are transmitted through a combined beam into which at least two among the analog beams and the digital beams are combined.

13. The communication method according to claim 12, wherein the combined beam is generated by virtualizing panels belonging to a beamformer to have a single boresight.

14. A receiver of a communication system comprising a processor and a memory storing at least one instruction executed by the processor, wherein the at least one instruction is configured to:
   receive reference signals from a transmitter of the communication system through beams to which the hybrid beamforming is applied;
   select at least one analog beam having a quality equal to or higher than a preset threshold value among analog beams belonging to the beams, based on the reference signals;
   select at least one digital beam corresponding to the at least one analog beam and having a quality equal to or higher than the preset threshold value among digital beams belonging to the beams, based on the reference signals; and
   transmit information indicating at least one of the at least one analog beam and the at least one digital beam to the transmitter.

15. The receiver according to claim 14, wherein, in the selecting of the at least one analog beam, the at least one instruction is further configured to:
   select at least one horizontal analog beam having a quality equal to or higher than the preset threshold value among horizontal analog beams belonging to the analog beams; and
   select at least one vertical analog beam having a quality equal to or higher than the preset threshold value among vertical analog beams belonging to the analog beams.

16. The receiver according to claim 15, wherein, in the selecting of the at least one digital beam, the at least one instruction is further configured to:
   select at least one horizontal digital beam corresponding to the at least one horizontal analog beam and having a quality equal to or higher than the preset threshold value among horizontal digital beams belonging to the digital beams; and select at least one vertical digital beam corresponding to the at least one vertical analog beam and having a quality equal to or higher than the preset threshold value among vertical digital beams belonging to the digital beams.

17. The receiver according to claim 16, wherein the at least one vertical analog beam is vertically arranged with the at least one horizontal analog beam, and the at least one vertical digital beam is vertically arranged with the at least one horizontal digital beam.

18. The receiver according to claim 14, wherein the reference signals are received through a combined beam of the transmitter.

19. The receiver according to claim 14, wherein the digital beams are generated by electrical tilting of the analog beams.

20. The receiver according to claim 14, wherein, in the selecting of the at least one digital beam, the at least one instruction is further configured to identify a precoding vector of the at least one digital beam.

* * * * *